United States Patent
Kasamatsu et al.

(10) Patent No.: US 8,037,301 B2
(45) Date of Patent: Oct. 11, 2011

(54) SETTING AN ENCRYPTION KEY

(75) Inventors: Daisuke Kasamatsu, Chita-gun (JP); Michihiro Nakamura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 988 days.

(21) Appl. No.: 11/406,388

(22) Filed: Apr. 19, 2006

(65) Prior Publication Data

US 2007/0180232 A1 Aug. 2, 2007

(30) Foreign Application Priority Data

Apr. 20, 2005 (JP) ................................. 2005-122872

(51) Int. Cl.
*H04L 9/00* (2006.01)
*H04L 9/14* (2006.01)
*H04L 29/06* (2006.01)

(52) U.S. Cl. .......................................... 713/159; 380/44
(58) Field of Classification Search .................... 380/44; 713/159

See application file for complete search history.

(56) References Cited

U.S. PATENT DOCUMENTS

| | | | | |
|---|---|---|---|---|
| 5,677,954 A | * | 10/1997 | Hirata et al. | 380/257 |
| 6,011,847 A | * | 1/2000 | Follendore, III | 713/160 |
| 7,412,542 B1 | * | 8/2008 | Newson et al. | 709/249 |
| 7,681,030 B2 | | 3/2010 | Uchida et al. | |
| 2002/0178365 A1 | | 11/2002 | Yamaguchi | |
| 2002/0191572 A1 | * | 12/2002 | Weinstein et al. | 370/338 |
| 2004/0171399 A1 | | 9/2004 | Uchida et al. | |
| 2004/0203591 A1 | * | 10/2004 | Lee | 455/410 |
| 2006/0153384 A1 | * | 7/2006 | Bhesania et al. | 380/270 |

FOREIGN PATENT DOCUMENTS

| | | |
|---|---|---|
| JP | 2001-325525 | 11/2001 |
| JP | 2002-359631 | 2/2002 |
| JP | 2004-228793 | 8/2004 |
| WO | 95-02292 | 1/1995 |
| WO | 03-067811 | 8/2003 |

OTHER PUBLICATIONS

Netgear. "Netgear MA521 802.11b Wireless PC Card Installation Guide", Mar. 2003.*
Wu et al. "SOLA: Lightweight Security for Access Control in IEEE 802.11", 2004 IEEE.*
IEEE. "802.11i, Part 11: Wireless LAN Medium Access Control (MAC) and Physical Layer (PHY) specifications, Amendment 6: Medium Access Control (MAC) Security Enhancements", Jul. 2004.*
Kaliski, B. "PKCS #5: Password-Based Cryptography Specification, Version 2.0", Sep. 2000.*
Notification of Reasons for Rejection received in corresponding Japanese Application No. 2005-122872 dated May 17, 2011.
Notice of Allowance received in Japanese Counterpart Application No. 2005-122872 dated Aug. 2, 2011.

* cited by examiner

*Primary Examiner* — Michael Simitoski
(74) *Attorney, Agent, or Firm* — Banner & Witcoff, Ltd.

(57) ABSTRACT

In some aspects, an encryption key setting method includes inputting a code string, selecting a generating procedure for generating a code string from a plurality of generating procedures that were previously set, generating a code string using the inputted code string based upon the selected generating procedure, and setting the generated code string as an encryption key.

17 Claims, 18 Drawing Sheets

SETTING AN ENCRYPTION KEY

CROSS-REFERENCE TO RELATED APPLICATION

This application claims priority under 35 U.S.C. §119 from Japanese Patent Application No. 2005-122872, filed on Apr. 20, 2005. The entire subject matter of the application is incorporated herein by reference.

TECHNICAL FIELD

Aspects of the invention relate to one or more techniques that may be used for setting an encryption key.

BACKGROUND

Conventionally, a wireless network device such as an access point and wireless LAN adaptor is generally configured to encrypt data to be sent to a transmission channel with a common key encryption method such that a third party cannot read out the data even though the third party intercepts the data sent to the transmission channel.

In a common key encryption method, a string of codes, each of which corresponds to each of characters of a character string inputted by a user of the wireless network device, is set as the encryption key, and the data to be transmitted are encrypted using the encryption key. Meanwhile, the data are decrypted at a receiving side using the same encryption key. Therefore, even though the third party intercepts the data, the data cannot be decrypted without the same encryption key.

Meanwhile, in such a common key encryption method, in order to make it difficult for the third party to ascertain what kind of encryption key is used, it is necessary to increase the number of the character codes necessary for the encryption key so as to increase possible combinations of the string of the character codes.

However, in this case, there is a problem that the user has to input a lot of characters to the wireless network device, that is, the user is required to make much effort to configure the encryption key. As a technique to solve this problem, there is considered the following: the wireless network device is configured to perform an encrypting operation using an encryption key that consists of a lot of predetermined character codes without the encryption key being set by the user.

However, in this case, if the third party obtains such a wireless network device, the encryption key might easily be ascertained.

SUMMARY

Aspects of the invention are advantageous in that one or more techniques that may be used to set an encryption key that cannot easily be ascertained by a third party without effort being required.

BRIEF DESCRIPTION OF THE ACCOMPANYING DRAWINGS

DETAILED DESCRIPTION

Figure 1:
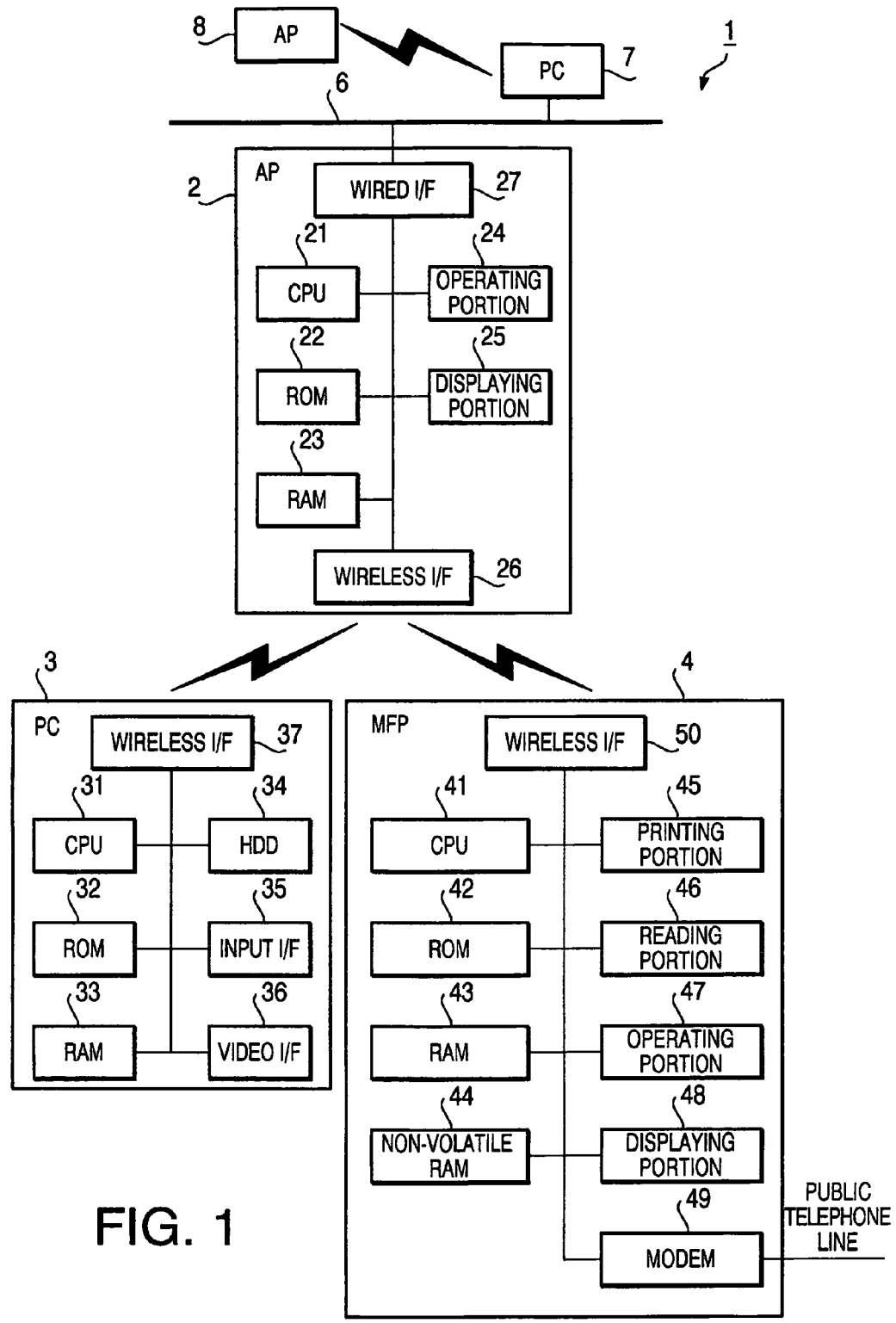
FIG. 1 is a block diagram showing a configuration of a network system according to at least one aspect of the present invention.

It is noted that various connections are set forth between elements in the following description. It is noted that these connections in general and, unless specified otherwise, may be direct or indirect and that this specification is not intended to be limiting in this respect.

General Overview

According to aspects of the present invention, there is provided an encryption key setting method, which includes: inputting a code string; selecting a generating procedure for generating a code string from a plurality of generating procedures that were previously set; generating a code string using the code string inputted in said inputting based upon the generating procedure selected in said selecting; and setting the code string generated in said generating as an encryption key.

According to aspects of the aforementioned method, as far as both of the inputted code string and the selected generating procedure are not made clear, the set encryption key cannot easily be ascertained. Further, if the generating procedure is set such that the code string, whose codes are more than the codes of the inputted code string, is generated, the encryption key, which cannot easily be ascertained because of a lot of codes included therein, can be set without much effort.

Optionally, the encryption key setting method may include selecting a code string from a plurality of code strings that were previously set. In this case, the plurality of generating procedures may include at least one generating procedure in which the code string to be set as the encryption key in said setting is generated using the code string selected in said selecting the code string as well as the code string inputted in said inputting.

According to some aspects, since it is impossible to ascertain the encryption key without making the selected code string clear, it can be made difficult further to ascertain the encryption key.

According to another aspect of the present invention, there is provided an encryption key setting device configured to set an encryption key, which includes: a code string inputting system configured to receive an external input of a code string; a generating procedure selecting system configured to receive an external input for selecting any one from a plurality of generating procedures that were previously set; a code string generating system configured to generate a code string using the code string inputted through the code string inputting system based upon the generating procedure selected through the generating procedure selecting system; and a first encryption key setting system configured to set the code string generated through the code string generating system as the encryption key.

Namely, according to the aforementioned encryption key setting device, as far as both of the inputted code string and the selected generating procedure are not made clear, the set encryption key cannot easily be ascertained. Further, if the generating procedure is set such that the code string, whose codes are more than the codes of the inputted code string, is generated, the encryption key, which cannot easily be ascertained because of a lot of codes included therein, can be set without much effort.

Optionally, the encryption key setting device may further include a code string selecting system configured to receive an external input for selecting any one from a plurality of optional code strings that were previously set. Optionally, the plurality of generating procedures may include at least one generating procedure in which the code string to be set as the encryption key by the first encryption key setting system is generated using the optional code string selected through the code string selecting system as well as the code string inputted through the code string inputting system.

In some aspects, since it is impossible to ascertain the encryption key without making the selected optional code string clear, it can be made difficult further to ascertain the encryption key.

Optionally, the plurality of generating procedures may include at least one generating procedure in which the code string to be set as the encryption key by the first encryption key setting system is generated by linking the inputted code string and the selected optional code string.

In some aspects, the encryption key can be generated only by linking the inputted code string and the selected optional code string without a complicated procedure being required. It is noted that, in this generating procedure, any way to link the inputted code string and the selected optional code string can be applied. For example, the selected optional code string may be linked to one of the head and rear end of the inputted code string. The selected optional code string may be inserted into a previously specified place in the inputted code string. In addition, the selected optional code string may be linked to the inputted code string such that each of the codes of the selected optional code string is inserted between each couple of adjacent codes of the inputted code string in order.

Optionally, the plurality of generating procedures may include at least one generating procedure in which the code string to be set as the encryption key by the first encryption key setting system is generated by linking the inputted code string and a setting code that was previously set. According to some aspects, the encryption key can be generated only by linking the inputted code string and the setting code without a complicated procedure being required.

It is noted that, in this generating procedure, any way to link the inputted code string and the setting code can be applied. For example, the selected optional code string may be linked to one of the head and rear end of the inputted code string. the setting code may be inserted into a previously specified place in the inputted code string.

Optionally, the plurality of generating procedures may include at least one generating procedure in which the code string to be set as the encryption key by the first encryption key setting system is generated by performing one logic operation of an exclusive OR operation and an exclusive negative OR operation for codes included in the inputted code string and codes included in the selected optional code string.

According to some aspects, the encryption key can be generated by performing the exclusive OR operation or the exclusive negative OR operation for the codes of the inputted code string and the codes of the selected optional code string. Since the inputted code string or the selected optional code string cannot be included as it is in such an encryption key, the inputted code string or the selected optional code string can be prevented from being easily ascertained from the encryption key.

In other words, even though a third party ascertains the encryption key, and tries to generate a similar encryption key using the encryption key setting device, it is difficult to ascertain that a similar encryption key can be generated by inputting what kind of code string, and by selecting which optional code string. Therefore, it is prevented to easily generate a similar encryption key using the encryption key setting device.

It is noted that, in this generating procedure, the logic operation may be intended for all of the codes included in the inputted code string and the selected optional code string. With respect to at least one of both of the code strings, the logic operation may be intended for a part of the codes.

Optionally, the plurality of generating procedures may include at least one generating procedure in which the code string to be set as the encryption key by the first encryption key setting system is generated by performing one logic operation of an exclusive OR operation and an exclusive negative OR operation for codes included in the inputted code string and a setting code that was previously set, and linking the code string generated by the logic operation and the selected optional code string.

According to some aspects, the encryption key can be generated by performing one logic operation of the exclusive OR operation and the exclusive negative OR operation for the codes included in the inputted code string and the codes included in the setting code that was previously set, and thereafter linking the code string generated by the logic operation and the selected optional code string.

It is noted that, in this generating procedure, the logic operation may be intended for all or a part of the codes included in the inputted code string. Further, the selected optional code string may be linked to one of the head and rear end of the code string obtained by the logic operation. The selected optional code string may be inserted into a previously specified place in the code string obtained by the logic operation. In addition, the selected optional code string may be linked to the code string obtained by the logic operation such that each of the codes of the selected optional code string is inserted between each couple of adjacent codes of the code string obtained by the logic operation in order.

Optionally, each of the plurality of optional code strings may include at least one code that is set non-enterable in a character code standard that was previously set. According to some aspects, even though the inputted code string, the generating procedure, or the selected optional code string is made clear by the third party, since it is impossible to input the code set non-enterable, it can be made difficult for the third party to generate the encryption key.

Optionally, the encryption key setting device may further include a specified input receiving system configured to receive an external specified input that was previously set, and a second encryption key setting system configured to forbid an operation of the first encryption key setting system when the specified input receiving system receives the external specified input, and set the code string inputted through the code string inputting system as the encryption key.

According to some aspects, when the user wants to set the inputted code string as the encryption key, it is possible to set the inputted code string as it is as the encryption key with the user giving the external specified input.

Optionally, the encryption key setting device may further include a specified input receiving system configured to receive an external specified input that was previously set, and a second encryption key setting system configured to forbid an operation of the first encryption key setting system when the number of codes included in the code string inputted through the code string inputting system is equal to or more than a specified number that was previously set, and set the inputted code string as the encryption key.

In some aspects, the user, who does not mind inputting a lot of codes to set the encryption key that cannot easily be ascertained by the third party, can set the encryption key by setting the specified number large. Further, it is possible to communicate with not only the device to which the present invention is applied, but also a conventional device that can merely set the inputted code string as the encryption key.

According to a further aspect of the present invention, there is provided a data transmitting device, which includes: one of the aforementioned encryption key setting devices; a data transmitting system configured to transmit data to an external device; and an encrypting system configured to encrypt the data to be transmitted by the data transmitting system based upon the encryption key set by the encryption key setting device.

Namely, according to the above data transmitting device, it is possible to set the encryption key, which cannot easily be ascertained by the third party, without effort being required, and encrypt the data to be transmitted using the set encryption key.

According to a further aspect of the present invention, there is provided a data receiving device, which includes: one of the aforementioned encryption key setting devices; a data receiving system configured to receive data from an external device; and a decrypting system configured to decrypt the data to be received by the data receiving system based upon the encryption key set by the encryption key setting device.

Namely, according to the above data receiving device, it is possible to set the encryption key, which cannot easily be ascertained by the third party, without effort being required, and decrypt the data, which is encrypted with an encryption key set in the same procedure, using the set encryption key.

According to a further aspect of the present invention, there is provided an access point, which includes: one of the aforementioned encryption key setting devices; a data relaying system configured to receive data from an external device and send the data to a destination thereof; and a decrypting system configured to decrypt the data to be received and sent by the data relaying system based upon the encryption key set by the encryption key setting device.

Namely, according to the above access point, it is possible to set the encryption key, which cannot easily be ascertained by the third party, without effort being required, and decrypt the data to be relayed (to be received from the external device and sent to the destination) using the set encryption key. Moreover, since the data to be relayed is decrypted at the access point, the destination, which does not have a means to decrypt the data, is not required to decrypt the data.

Preferably or optionally, the destination of the data decrypted by the decrypting system may be located on a wired transmission channel. In some aspects, it is prevented to relay (receive and send) the decrypted data via a wireless transmission channel through which the data transmitted can easily be intercepted by the third party. Additionally, since the data to be relayed is decrypted when the data are relayed via the wired transmission channel through which the data transmitted cannot easily be intercepted by the third party compared with the wireless transmission channel, effort for decrypting the data at the destination can be saved.

According to a further aspect of the present invention, there is provided a network system, which includes one of the aforementioned data transmitting devices, one of the aforementioned data receiving devices, and one of access points.

Namely, according to the above network system, it is possible to set the encryption key, which cannot easily be ascertained by the third party, without effort being required, and encrypt and decrypt the data using the set encryption key.

According to a further aspect of the present invention, there is provided a computer program product including computer readable instructions that cause a computer to serve as at least one of systems included in each of the aforementioned encryption key setting devices.

Namely, according to the above computer program product, it is possible to make the computer serve as at least one of systems included in each of the aforementioned encryption key setting devices.

According to a further aspect of the present invention, there is provided a computer program product including computer readable instructions that cause a computer to serve as at least one of systems included in each of the aforementioned data transmitting devices. Namely, according to the above computer program product, it is possible to make the computer serve as at least one of systems included in each of the aforementioned data transmitting devices.

According to a further aspect of the present invention, there is provided a computer program product including computer readable instructions that cause a computer to serve as at least one of systems included in each of the aforementioned data receiving devices. Namely, according to the above computer program product, it is possible to make the computer serve as at least one of systems included in each of the aforementioned data receiving devices.

According to a further aspect of the present invention, there is provided a computer program product including computer readable instructions that cause a computer to serve as at least one of systems included in each of the aforementioned access points.

Namely, according to the above computer program product, it is possible to make the computer serve as at least one of systems included in each of the aforementioned access points. It is noted that the aforementioned computer readable instructions may be stored a recording medium such as a flexible disk (FD), magneto-optical disk (MO), digital versatile disk (DVD), CD-ROM, Blu-Ray disk, HD-DVD, hard disk, and memory card, so as to be used with being loaded from such a recording medium to the computer. Moreover, the computer readable instructions may be stored in a ROM or a back-up RAM incorporated in the computer to be used with being loaded from the ROM or the back-up RAM to the computer. Further, the computer readable instructions may be used with being loaded to the computer via the network.

Illustrative Aspects

Hereinafter, illustrative aspects according to the present invention will be explained with reference to the accompanying drawings. FIG. 1 is a block diagram showing a configuration of a network system according to certain aspects of the present invention.

As shown in FIG. 1, the network system 1 is configured with an access point (hereinafter, simply referred to as an "AP") 2 connected with a personal computer (hereinafter, simply referred to as a "PC") 3 and a Multi Function Peripheral (hereinafter, simply referred to as an "MFP") via wireless transmission channels, and a PC 7 via a network cable 6. It is noted that the PC 7 is also connected to an AP 8 of another network system via a wireless transmission channel. FIG. 1 shows only the PC 7 on the network cable 6 for the sake of simple explanation of this illustrative embodiment. However, actually, there are connected to the network cable 6 a lot of devices including other PCs of the same model as the PC 7 and/or other models, and/or other devices such as printers.

The AP 2 according to certain aspects of the present invention is provided with a CPU 21 configured to execute various processes to be executed in the AP 2, a ROM 22 configured to store software including programs for the various processes to be executed by the CPU 21 and data used for the various processes, a RAM 23 employed as a memory area while the CPU 21 is executing the various processes, an operating portion 24 configured to input to the CPU 21 an input signal issued from various keys (not shown) provided outside the AP 2 to carry out various setting operations for the AP 2 and input numerical characters and/or alphabets, a displaying portion 25 configured to display information on various settings for the AP 2 on a display device (not shown) provided outside the AP 2 based upon an instruction from the CPU 21, a wireless interface (I/F) 26 configured to establish the communications with the PC 3 and the MFP 4 based upon a predetermined wireless network standard (IEEE 802.11 in this illustrative embodiment), and a wired I/F 27 configured to establish the communication between the CPU 21 and the PC 7. The AP 2 is configured by interconnecting the aforementioned constituent elements.

In addition, the PC 3 according to certain aspects of the present invention is provided with a CPU 31 configured to execute various processes to be executed in the PC 3, a ROM 32 configured to store software such as a boot process program (BIOS) to be executed by the CPU 31 on start-up of the PC 3, a RAM 33 employed as a memory area while the CPU 31 is executing the various processes, a hard disk drive (HDD) 34 configured to store software including an operating system, programs for the various processes to be executed by the CPU 31, and data used for the various processes, an input I/F 35 configured to input to the CPU 31 an input signal issued from a keyboard (not shown) or a mouse (not shown) connected to the PC 3, a video I/F 36 configured to perform a displaying operation on a display device (not shown) connected to the PC 3 based upon an instruction from the CPU 31, and a wireless I/F 37 configured to establish the communication between the CPU 31 and the AP 2 based upon a predetermined wireless network standard (IEEE 802.11 in this illustrative embodiment). The PC 3 is configured by interconnecting the aforementioned constituent elements.

In addition, the MFP 4 according to certain aspects of the present invention is provided with a CPU 41 configured to execute various processes to be executed in the MFP 4, a ROM 42 configured to store software including programs for the various processes to be executed by the CPU 41 and data used for the various processes, a RAM 43 employed as a memory area while the CPU 41 is executing the various processes, a non-volatile RAM 44 configured to record data generated and/or errors occurring while the CPU 41 is executing various processes, a printing portion 45 configured to control a printing mechanism (not shown) incorporated in the MFP 4 that carries out a printing operation on a printing media, a reading portion 46 configured to control a reading mechanism (not shown) that reads an image on the printing medium externally supplied based upon an instruction from the CPU 41, an operating portion 47 configured to input to the CPU 41 an input signal issued from various keys (not shown) provided outside the MFP 4 to carry out various setting operations for the MFP 4 and input numerical characters and/or alphabets, a displaying portion 48 configured to display information on various settings for the MFP 4 on a display device (not shown) provided outside the MFP 4 based upon an instruction from the CPU 41, a modem 49 configured to establish the communication between the CPU 41 and a public telephone line, and a wireless I/F 50 configured to establish the communication between the CPU 41 and AP 2 based upon a predetermined wireless network standard (IEEE802.11 in this illustrative embodiment). The MFP 4 is configured by interconnecting the aforementioned constituent elements.

It is noted that the PC 7 is not according to the present invention, but the same as a conventional PC. For this reason, a configuration of the PC 7 is not concretely shown in any accompanying drawings. The PC 7 is provided with a wireless I/F configured to establish the communication with the AP 8 based upon a predetermined wireless network standard (IEEE802.11 in this illustrative embodiment) in addition to a CPU, ROM, RAM, HDD, input I/F, video I/F.

Figure 2:
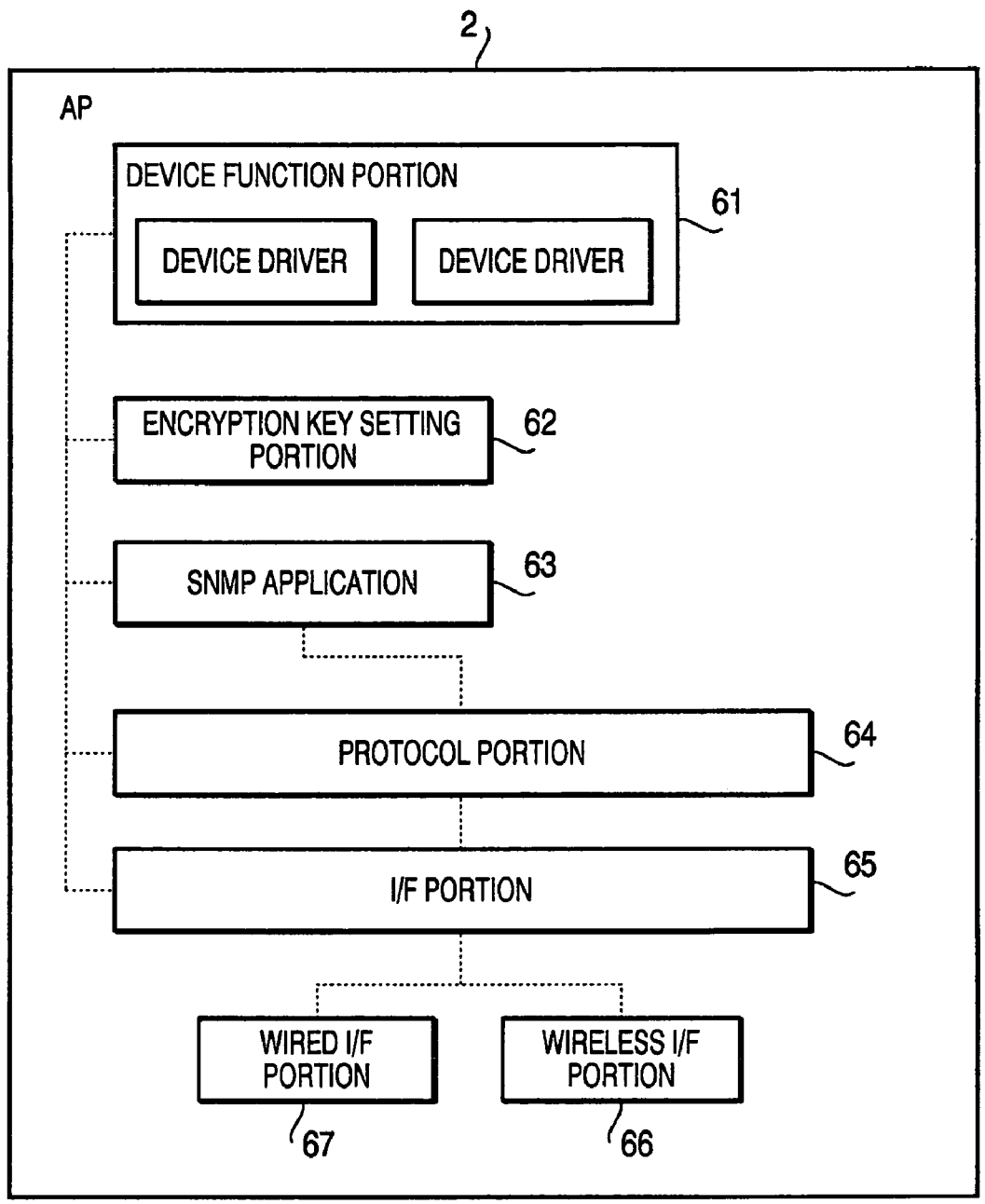
FIG. 2 is a functional block diagram showing functions according to at least one aspect of the present invention among various functions of an AP.

FIG. 2 is a functional block diagram showing functions according to certain aspects of the present invention among various functions of the AP 2. As shown in FIG. 2, in the AP 2, with the various processes being executed by the CPU 21 according to the software, function a device function portion 61 configured to operate the operating portion 24 and the displaying portion 25 with a plurality of software (device drivers), an encryption key setting portion 62 configured to set an encryption key used to encrypt and decrypt data, an SNMP (Simple Network Management Protocol) application 63 configured to configure settings for the AP 2, and inform an external of a status of the AP 2 according to a request from the external based upon an SNMP protocol, a protocol portion 64 configured to obtain data from a packet received from the external device and generate a packet including data to be transmitted to the external device, an I/F portion 65 configured to obtain a packet from a frame received from the external device and generate a frame including a packet to be transmitted to the external device, a wireless I/F portion 66 configured to send to and receive from the external the frame via the wireless transmission channel with operating the wireless I/F 26, and a wired I/F portion 67 configured to send to and receive from the external the frame via the network cable 6.

Figure 3:
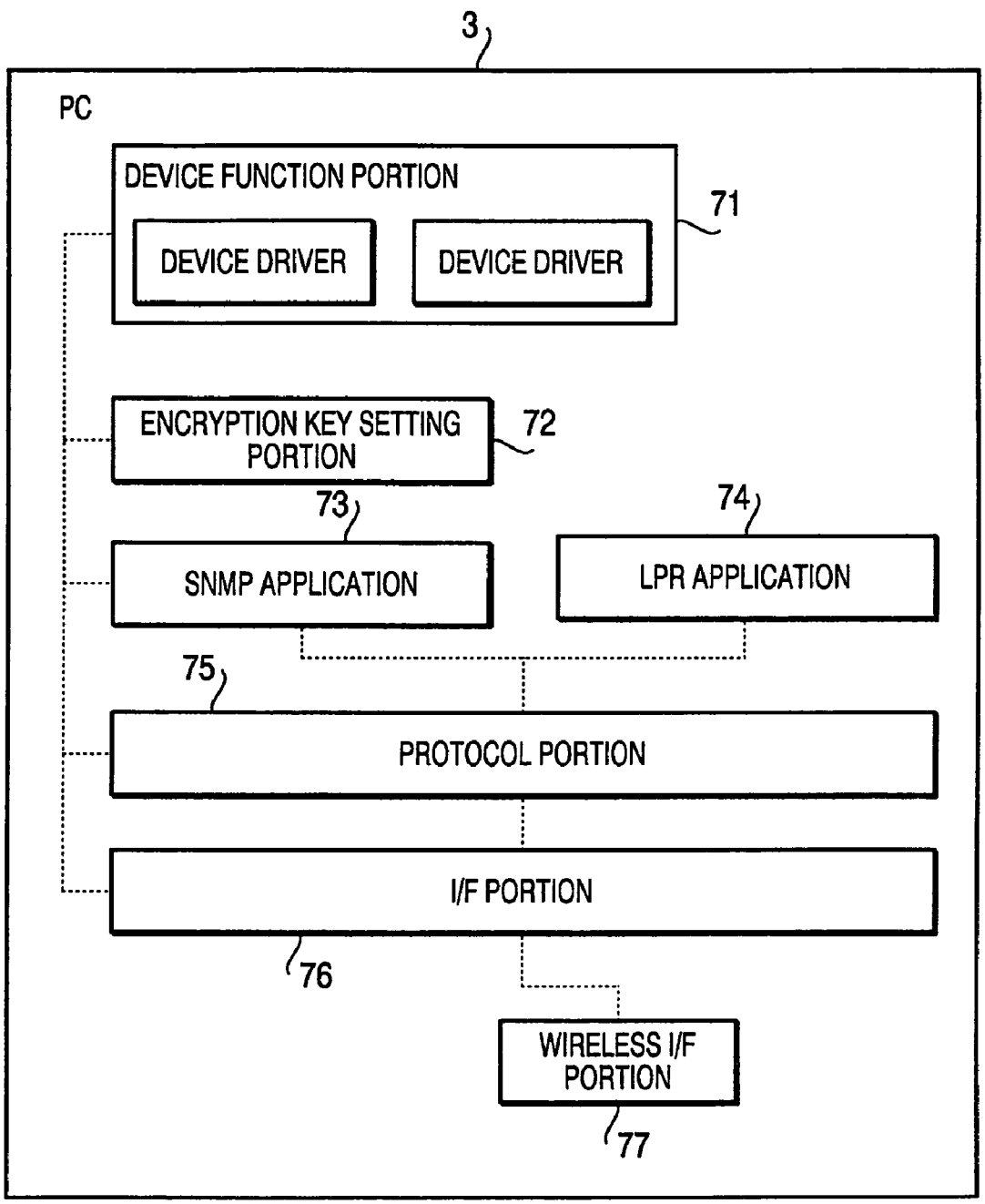
FIG. 3 is a functional block diagram showing functions according to at least one aspect of the present invention among various functions of a PC.

FIG. 3 is a functional block diagram showing functions according to certain aspects of the present invention among various functions of the PC 2. As shown in FIG. 3, in the PC 2, with the various processes being executed by the CPU 31 according to the software, function a device function portion 71 configured to operate the input I/F 35 and the video I/F 36 with a plurality of software (device drivers), an encryption key setting portion 72 configured to set an encryption key used to encrypt and decrypt data, an SNMP application 73 configured to request an external to inform of settings and a status thereof based upon the SNMP protocol, an LPR (Line PRinter daemon protocol) application 74 configured to request the external to perform a printing operation based upon an LPR protocol, a protocol portion 75 configured to obtain data from a packet received from the external device and generate a packet including data to be transmitted to the external device, an I/F portion 76 configured to obtain a packet from a frame received from the external device and generate a frame including a packet to be transmitted to the external device, and a wireless I/F portion 77 configured to send to and receive from the external the frame via the wireless transmission channel with operating the wireless I/F 37.

In addition to the same function as the PC 3, the PC 7 includes a wired I/F portion configured to send to and receive from an external a frame via the network cable 6 with operating an wired I/F. However, each of the functional elements of the PC 7 is not according to the present invention, but is generally known.

Figure 4:
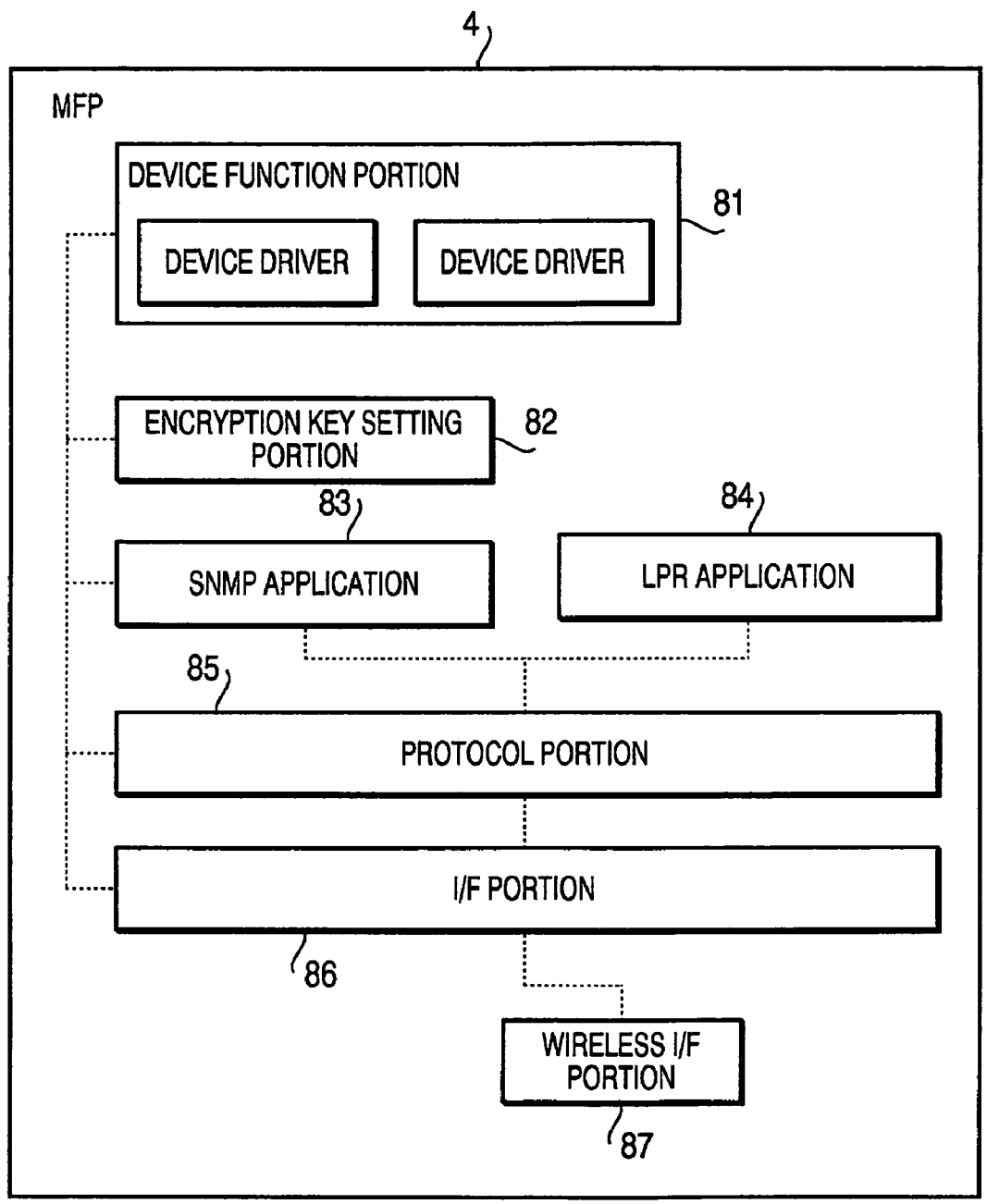
FIG. 4 is a functional block diagram showing functions according to at least one aspect of the present invention among various functions of an MFP.

FIG. 4 is a functional block diagram showing functions according to certain aspects of the present invention among various functions of the MFP 4. As shown in FIG. 4, in the MFP 4, with the various processes being executed by the CPU 31 according to the software, function a device function portion 81 configured to operate the printing portion 45, the reading portion 46, the operating portion 47, the displaying portion 48, the modem 49 with a plurality of software (device drivers), an encryption key setting portion 72 configured to set an encryption key used to encrypt and decrypt data, an SNMP application 83 configured to configure settings for the MFP 4 and inform the external of a status of the MFP 4 according to a request from the external based upon the SNMP protocol, an LPR application 84 configured to perform the printing operation according to a request for the printing operation based upon the LPR protocol from the external device, a protocol portion 85 configured to obtain data from a packet received from the external device and generate a packet including data to be transmitted to the external device, an I/F portion 86 configured to obtain a packet from a frame received from the external device and generate a frame including a packet to be transmitted to the external device, and a wireless I/F portion 87 configured to send to and receive from the external the frame via the wireless transmission channel with operating the wireless I/F 50.

Hereinafter, procedures of processes by the aforementioned various functions will be explained in detail. It is noted that among the various functions of the AP 2, PC 3, and MFP 4, regarding functions having processes that conform to each other, the procedures of the processes will be explained with the same flowchart. Therefore, there will be found cases where a function name of a device mingles in explanation for the procedure of the process by the function of one of the other devices. However, the function of a device is not involved with the process performed by the function of one of the other devices. The explanation for the procedure of a process will be given with respect to each of the devices. In addition, a concrete example of a code will be shown with a hexa-code for the sake of simple indication.

Figure 5:
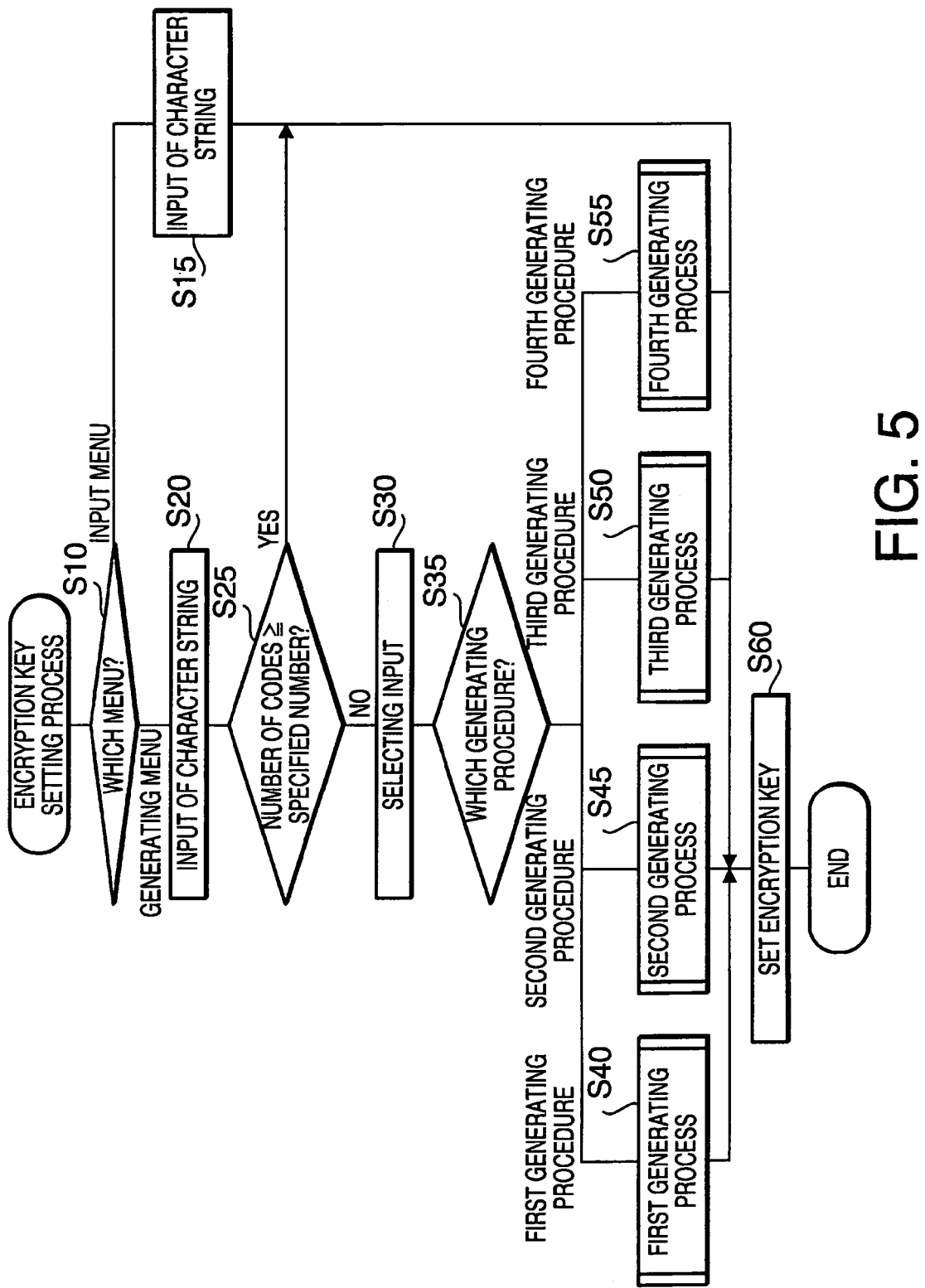
FIG. 5 is a flowchart showing a procedure of an encryption key setting process by an encryption key setting portion according to at least one aspect of the invention.

FIG. 5 is a flowchart showing a procedure of an encryption key setting process by the encryption key setting portion 62, 72, or 82. It is noted that, in the encryption key setting portion 62 of the AP 2, the encryption key setting process is executed, triggered by the encryption key being set necessary for sending/receiving the packet via the wireless transmission channel with a menu key for configuring the various settings for the AP 2, among the various keys provided outside the AP 2, being pressed by a user, and an encryption key setting menu is selected by pressing a selection key for selecting the encryption key setting menu in a various setting menu. Moreover, in the encryption key setting portion 72 of the PC 3, this process is executed, triggered by an encryption key setting menu being selected by operating the keyboard or the mouse. Further, this process is executed in the encryption key setting portion 82 of the MFP 4, triggered by a menu key for configuring the various settings for the MFP 4, among the various keys provided outside the MFP 4, being pressed, and an encryption setting menu being selected by pressing a selection key for selecting the encryption key setting menu in a various setting menu.

As shown in FIG. 5, in this process, first, it is judged which is selected as the encryption key setting menu between an input menu for the user inputting all codes of a code string to be set as the encryption key and a generating menu for automatically generating the code strings to be set as the encryption key (S10).

When the input menu is selected (S10: Input Menu), an input of a character string corresponding to the code string to be set as the encryption key is accepted (S15). When the input of the character string is finished, the process goes to the below-mentioned step of S60. It is noted that, in the illustrative embodiment, an ASCII (American Standard Code for Information Interchange) is set for each of the AP 2, PC 3, and MFP 4 as a character code standard. Accordingly, in the step of S15, a character code string in the ASCII codes corresponding to the inputted character strings is accepted.

Meanwhile, in the step of S10, when the generating menu is selected (S10: Generating Menu), an input of the character string is accepted in the same manner as the step of S15 (S20).

When the input of the character string is finished, it is judged whether the number of the codes in an input code string as the inputted character code string is equal to or more than a previously specified number (S25) or not. It is noted that, in the illustrative embodiment, the specified number is set such that the encryption key cannot easily ascertained by a third party (for example, the specified number is set equal to 16).

When the number of the codes is equal to or more than the specified number (S25: Yes), the process immediately goes to the below-mentioned step of S60. Meanwhile, when the number of the codes is less than the specified number (S25: No), a selecting input for selecting any one of four generating procedures, which are previously set to generate the code string to be set as the encryption key, is accepted (S30).

Then, it is judged which generating procedure is selected by the selecting input (S35). When a first generating procedure is selected (S35: First Generating Procedure), a first generating process that was previously set is executed (S40), and the process then goes to the below-mentioned step of S60.

When a second generating procedure is selected (S35: Second Generating Procedure), a second generating process that was previously set is executed (S45), and the process then goes to the below-mentioned step of S60. When a third generating procedure is selected (S35: Third Generating Procedure), a third generating process that was previously set is executed (S50), and the process then goes to the below-mentioned step of S60.

When a fourth generating procedure is selected (S35: Fourth Generating Procedure), a fourth generating process that was previously set is executed (S55), and the generated code string or the input code string is set as the encryption key (S60) to terminate the process.

Figure 6:
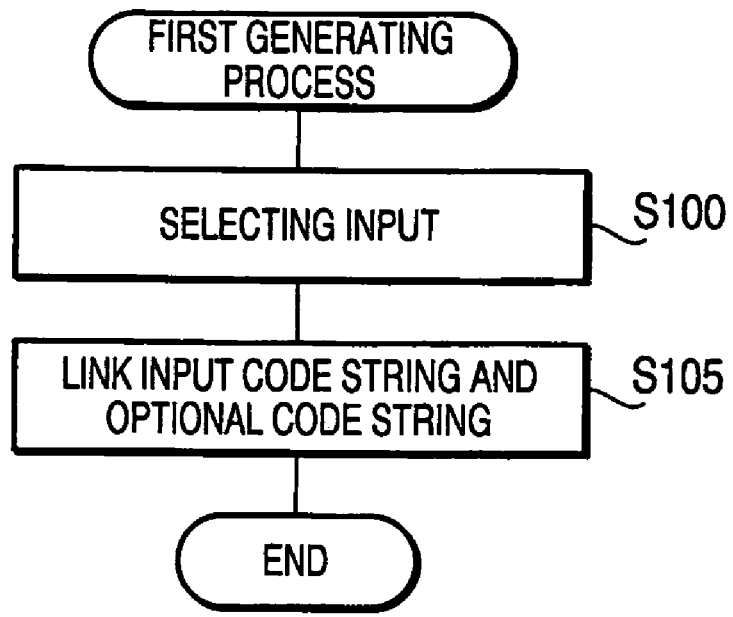
FIG. 6 is a flowchart showing a procedure of a first generating process according to at least one aspect of the invention.

FIG. 6 is a flowchart showing a procedure of the first generating process (S40). As shown in FIG. 6, in this process, first, a selecting input for selecting any one of optional code strings, which are various kinds of previously set code strings with the specified number of codes, is accepted (S100). It is noted that the optional code strings in this illustrative embodiment include codes that are set non-enterable in the ASCII codes (for example, control codes such as 00H-1FH, and 7FH).

Then, one code string is generated by linking the optional code string selected by the selecting input and the input code string (S105) to end the process. It is noted that, in the step of S105 in the illustrative embodiment, one code string is generated by linking the optional code string to the rear end of the input code string. In this case, when the number of the codes in the generated code string is over the maximum number defined in the standard of the encryption key, some codes at the rear end of the generated code string may be deleted.

The linking of the optional code string and the input code string may be a direct link between the code strings or an indirect link between the code strings. The term "linking" is intended to cover both aspects unless explicitly described otherwise.

Namely, in this first generating process, for example, when the input code string is 51H, 57H, 45H (corresponding to an inputted character string of Q, W, E), and the optional code string is 8FH, ABH, 93H, 09H, 08H, FFH, 82H, 83H, 93H, 99H, 84H, B1H, C4H, E0H, 83H, 02H, generated is one code string of 51H, 57H, 45H, 8FH, ABH, 93H, 09H, 08H, FFH, 82H, 83H, 93H, 99H, 84H, B1H, C4H, E0H, 83H, 02H.

Figure 7:
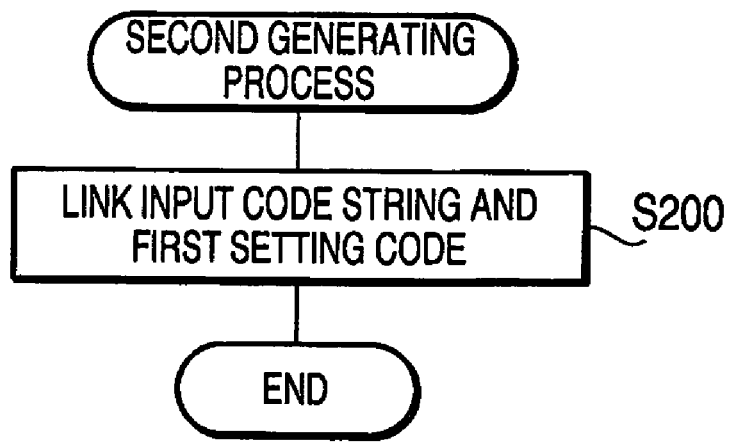
FIG. 7 is a flowchart showing a procedure of a second generating process according to at least one aspect of the invention.

FIG. 7 is a flowchart showing a procedure of the second generating process (S45). As shown in FIG. 7, in this process, one code string is generated by lining a first setting code, which is a previously set code, to the input code string (S200) to terminate the process. It is noted that, in the step of S200 in the illustrative embodiment, one code string is generated by linking the first setting code to the rear end of the input code string. If the number of the codes in the input code string is fewer than the specified number by one, the code string with the specified number of codes can be generated by linking the first setting code to the input code string.

Namely, in the second generating process, for example, when the input code string is 41H, 42H, 43H, 44H, 45H, 46H, 47H, 48H, 49H, 4AH, 4BH, 4CH, 4DH, 4EH, 4FH (corresponding to an inputted character string of A, B, C, D, E, F, G, H, I, J, K, L, M, N, O), and the first setting code is A3H, generated is one code string of 41H, 42H, 43H, 44H, 45H, 46H, 47H, 48H, 49H, 4AH, 4BH, 4CH, 4DH, 4EH, 4FH, A3H.

Figure 8:
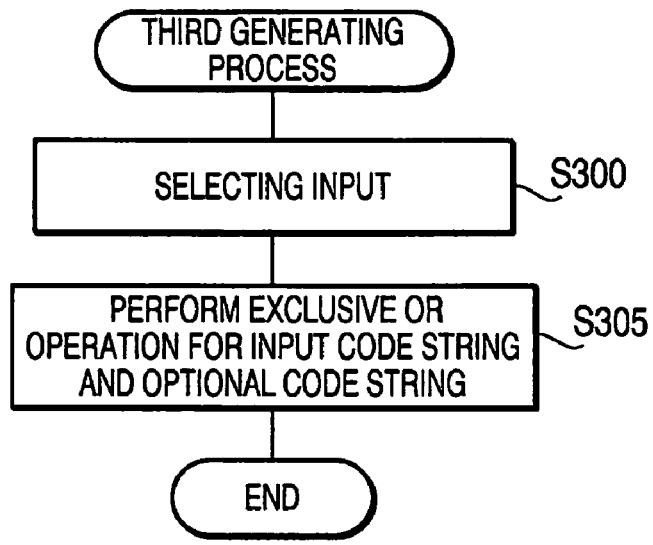
FIG. 8 is a flowchart showing a procedure of a third generating process according to at least one aspect of the invention.

FIG. 8 is a flowchart showing a procedure of the third generating process (S50). As shown in FIG. 8, in this process, first, in the same manner as the step of S100 in the first generating process, a selecting input for selecting one optional code string is accepted (S300). Then, one code string is generated by performing an exclusive OR operation for the codes in the optional code string selected by the selecting input and the codes in the input code string (S305) to terminate the process. It is noted that, in the step of S305 in the illustrative embodiment, one code string is generated by performing the exclusive OR operation for all of the codes in the input code string and an arbitrary part of codes in the optional code string and replacing the intended codes for which a logic operation is performed with the codes obtained by the logic operation.

Namely, in this third generating process, for example, when the input code string is 61H, 62H, 63H (corresponding to an inputted character string of a, b, c), and the optional code string is 8FH, ABH, 93H, 09H, 08H, FFH, 82H, 83H, 93H, 99H, 84H, B1H, C4H, E0H, 83H, 02H, one code string is generated by performing the exclusive OR operation for 61H in the input code string and 93H of the third code in the optional code string, the exclusive OR operation for 62H in the input code string and 09H of the fourth code in the optional code string, and the exclusive OR operation for 62H in the input code string and 82H of the seventh code in the optional code string, and replacing the third, fourth, and seventh codes in the optional code string with F2H, 6BH, E1H obtained as the result of the logic operation, respectively.

Figure 9:
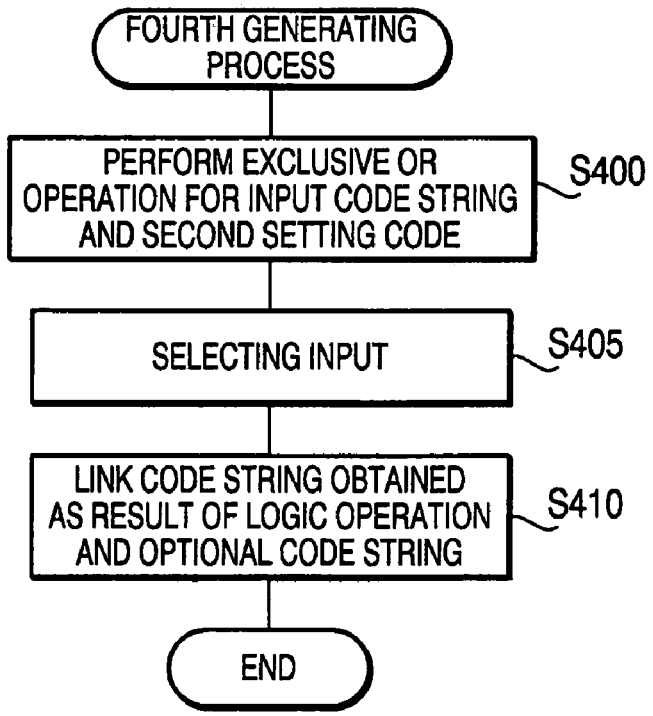
FIG. 9 is a flowchart showing a procedure of a fourth generating process according to at least one aspect of the invention.

FIG. 9 is a flowchart showing a procedure of the fourth generating process (S55). As shown in FIG. 9, in this process, first, the exclusive OR operation for the codes included in the input code string and a second setting code that was previously set is performed (S400). It is noted that, in the step of S400 of the illustrative embodiment, the logic operation is intended for all of the codes in the input code string.

In the same manner as the steps of S100 in the first generating process and S300 in the third generating process, a selecting input for selecting one of the optional code strings is then accepted (S405), and one code string is generated by linking the optional code string selected by the selecting input to the code string obtained as a result of the logic operation (S410) to end the process. It is noted that, in the step of S400 in the illustrative embodiment, one code string is generated by linking the optional code string to the rear end of the code string obtained as the result of the logic operation. In the same way as the first generating process, in this case, when the number of the codes in the generated code string is over the maximum number defined in the standard of the encryption key, the code at the rear end of the generated code string may be deleted.

Namely, in the fourth generating process, for example, when the input code string is 41H, 42H, 43H (corresponding to A, B, C in the character string), and the second setting code is A5H, a code string of E4H, E7H, E6H is generated by performing the exclusive OR operation for each of the codes in the input code string and the second setting code. Further, when the optional code string is 8FH, ABH, 93H, 09H, 08H, FFH, 82H, 83H, 93H, 99H, 84H, B1H, C4H, E0H, 83H, 02H, generated is one code string of E4H, E7H, E6H, 8FH, ABH, 93H, 09H, 08H, FFH, 82H, 83H, 93H, 99H, 84H, B1H, C4H, E0H, 83H, 02H.

Figure 10:
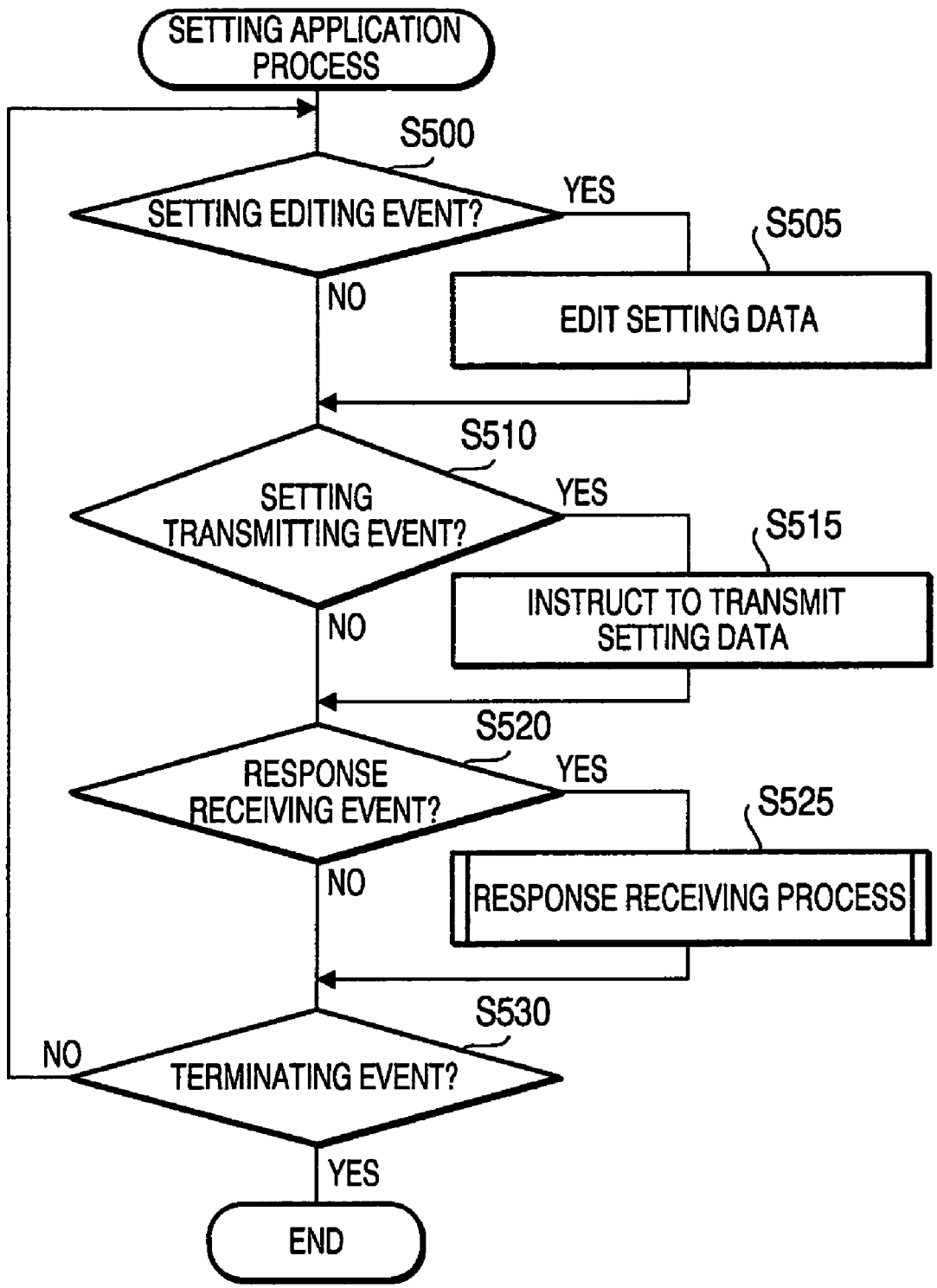
FIG. 10 is a flowchart showing a procedure of a setting application process by an SNMP application of the PC according to at least one aspect of the invention.

FIG. 10 is a flowchart showing a procedure of a setting application process by the SNMP application of the PC 3. It is noted that, according to the SNMP application 73, this process is executed, triggered by a menu for setting the AP 2 or the MFP 4 being selected by operating the keyboard or the mouse.

As shown in FIG. 10, in this process, first, it is judged whether a setting editing event, which represents that an input for editing setting data of the AP 2 or the MFP 4 has been given from the keyboard or the mouse, is happening (S500). When the setting editing event is not happening (S500: No), the process immediately goes to the below-mentioned the step of S510. Meanwhile, when the setting editing event is happening (S500: Yes), the setting data are edited in response to an input from the keyboard or the mouse (S505), and thereafter, it is judged whether a setting transmitting event, which represents that an input for transmitting the setting data has been given from the keyboard or the mouse, is happening (S510).

Here, when the setting transmitting event is not happening (S510: No), the process immediately proceeds to the below-mentioned step of S520. On the other hand, when the setting transmitting event is happening (S510: Yes), the protocol portion 75 is instructed to send the setting data by sending the setting data and an IP address of a destination thereof to the protocol portion 75 (S515).

Then, it is judged whether a response receiving event, which represents that the data has been received from the protocol portion 75, is happening (S520). When the response receiving event in not happening (S520: No), the process directly goes to the below-mentioned step of S530. Meanwhile, when the response receiving event is happening (S520: Yes), a response receiving process that was previously set is executed (S525), and thereafter, it is judged whether a terminating event, which represents that an instruction for terminating the process has been received, is happening (S530).

When the terminating event is not happening (S530: No), the process is brought back to the aforementioned step of S500. On the other hand, when the terminating event is happening (S530: Yes), the process is terminated.

Figure 11:
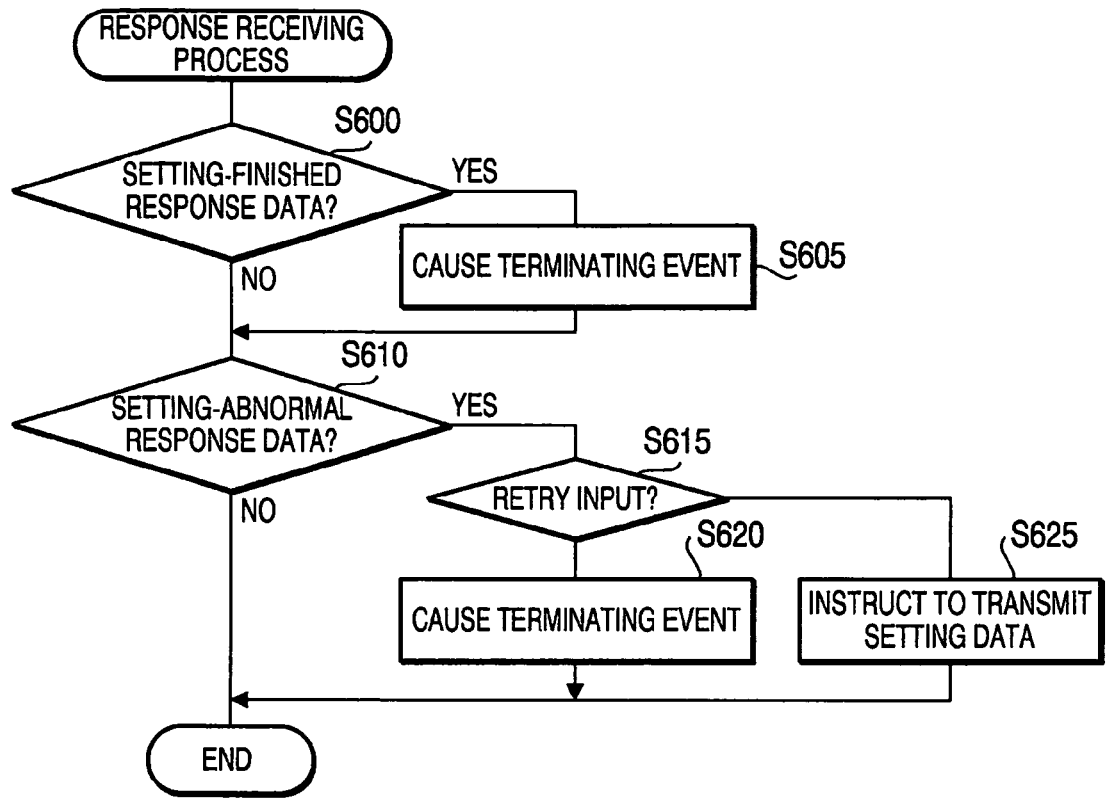
FIG. 11 is a flowchart showing a procedure of a response receiving process according to at least one aspect of the invention.

FIG. 11 is a flowchart showing a procedure of the response receiving process (S525). As shown in FIG. 11, in this process, first, it is judged whether data received from the protocol portion 75 is setting-finished response data representing that setting is normally finished in the AP 2 or the MFP 4 (S600). When the received data are not the setting-finished response data (S600: No), the process directly goes to the below-mentioned step of S610. Meanwhile, when the received data are the setting-finished response data (S600: Yes), the terminating event is caused (S605).

Thereafter, it is judged whether the data received from the protocol portion 75 is setting-abnormal response data representing that the setting is abnormal in the AP 2 or the MFP 4 (S610). When the received data are not the setting-abnormal response data (S610: No), the process is directly terminated.

On the other hand, when the received data are the setting-abnormal response data (S610: Yes), a dialogue for inquiring the user whether to retry the transmission of the setting data are displayed, and it is then judged whether a retry input for transmitting the data again has been given from the keyboard or the mouse (S615). When the retry input has not been given (S615: No), the terminating event is caused (S620) to terminate the process.

Meanwhile, when the retry input has been given (S615: Yes), an instruction of transmitting the setting data are issued in the same process as the step of S515 in the setting application process (S625) to end the process.

Figure 12:
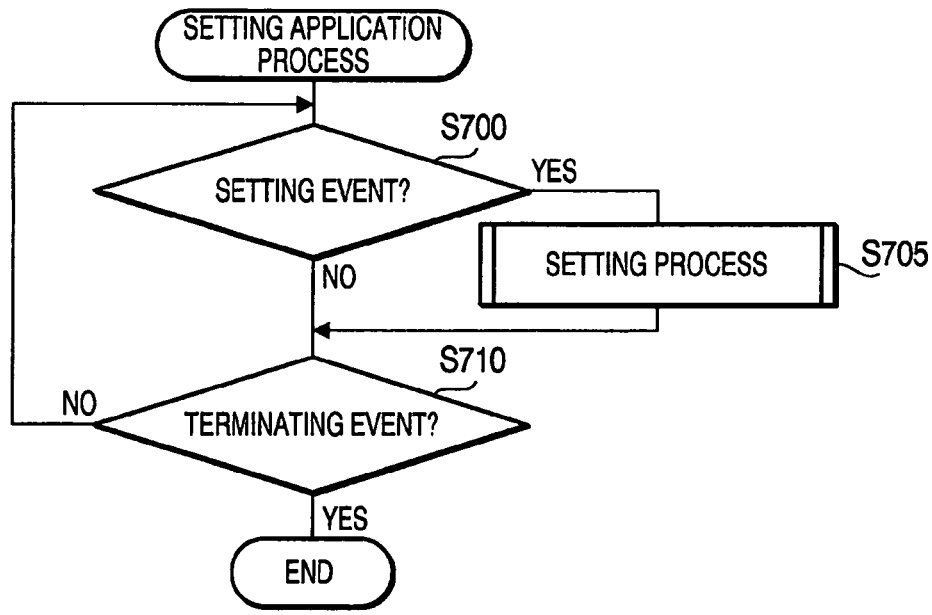
FIG. 12 is a flowchart showing a procedure of a setting application process executed by the SNMP application of each of the AP and the MFP according to at least one aspect of the invention.

In addition, FIG. 12 is a flowchart showing a procedure of a setting application process executed by each of the SNMP application 63 of the AP 2 and the SNMP application 83 of the MFP 4. It is noted that, in the SNMP application 63 or 83, this process is executed, triggered by the AP 2 or the MFP 4 being powered ON, or the AP 2 or the MFP 4 being reset.

As shown in FIG. 12, in this process, first, it is judged a setting event, which represents that setting data has been received from the protocol portion 64 or 85, is happening (S700). When the setting event is not happening (S700: No), the process directly proceeds to the below-mentioned step of S710.

On the other hand, when the setting event is happening (S700: Yes), a setting process that was previously set is executed (S705), and thereafter, it is judged whether a terminating event, which represents that an instruction of terminating the process issued by a key input from an external has been received, is happening (S710).

When the terminating event is not happening (S710: No), the process is brought back to the aforementioned step of S700. Meanwhile, the terminating event is happening (S710: Yes), the process is terminated.

Figure 13:
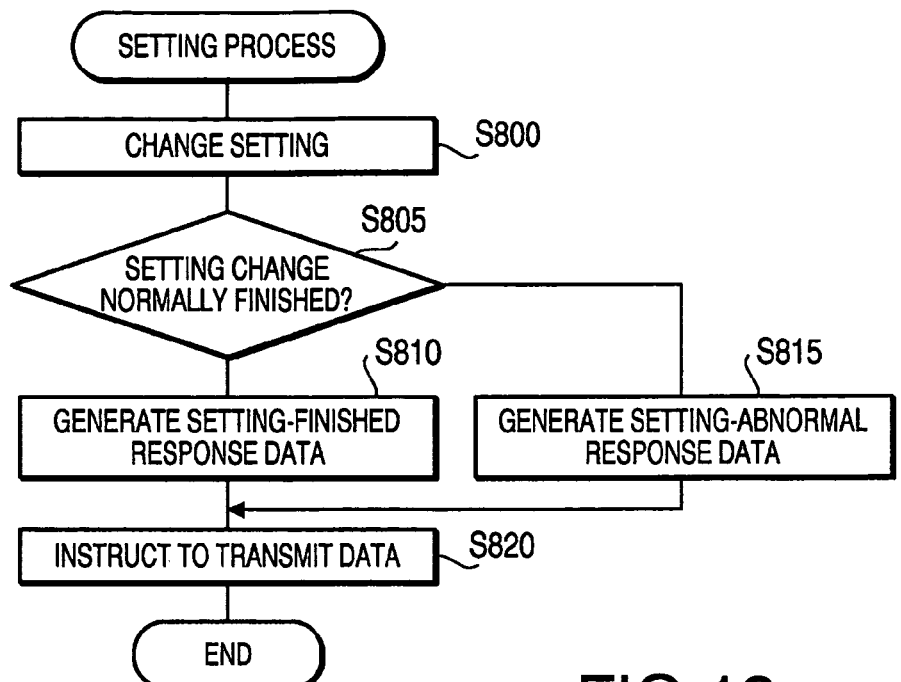
FIG. 13 is a flowchart showing a procedure of a setting process according to at least one aspect of the invention.

FIG. 13 is a flowchart showing a procedure of the setting process (S705). As shown in FIG. 13, in this process, first, the setting is changed by updating the setting data configured by the AP 2 or the MFP 4 with the received setting data (S800), and then, it is judged whether the setting change is normally finished (S805).

When the setting change is normally finished (S805: Yes), the aforementioned setting-finished response data are generated. Meanwhile, when the setting change is not normally finished (S805: No), the aforementioned setting-abnormal response data are generated (S815).

Then, the protocol portion 64 or 85 is instructed to transmit the data by sending an IP address of a destination (the PC 3 in this case) of the data as well as the generated setting-finished response data or the setting-abnormal response data (S820), and the process is terminated.

Figure 14:
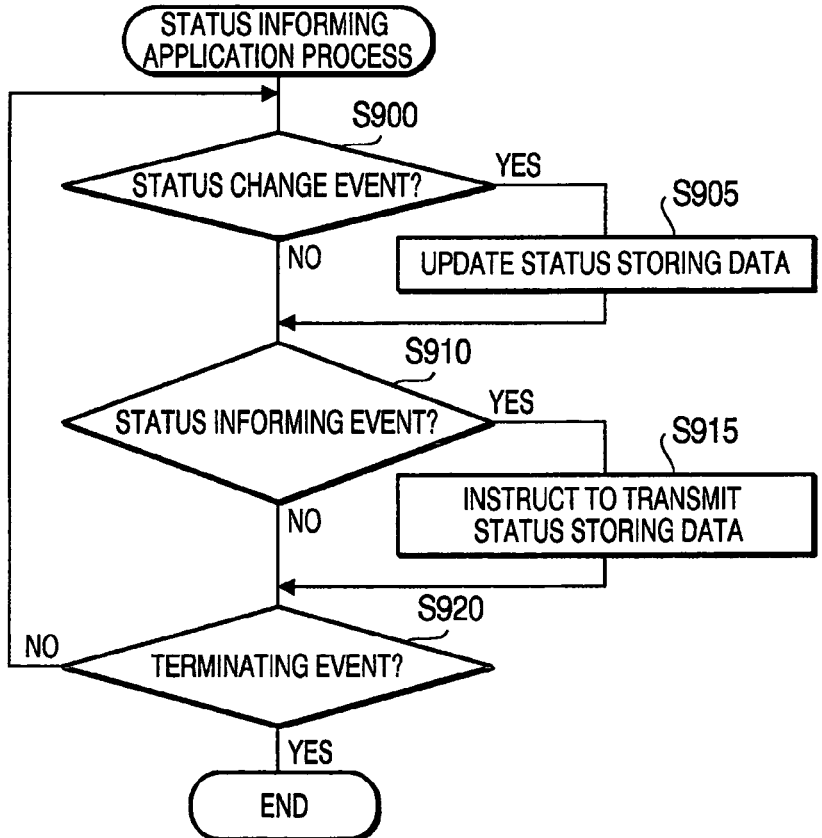
FIG. 14 is a flowchart showing a procedure of a status informing application process performed by the SNMP application of each of the AP and the MFP according to at least one aspect of the invention.

FIG. 14 is a flowchart showing a procedure of a status informing application process performed by each of the SNMP application 63 of the AP 2 and the SNMP application 83 of the MFP 4. It is noted that this process is executed by the SNMP application 63 or 83, triggered by the AP 2 or the MFP 4 being reset.

As shown in FIG. 14, in this process, first, it is judged whether a status change event, which represents that a sensor or the device driver of the AP 2 or the MFP 4 has detected a status change of a corresponding one of the AP 2 or the MFP 4, is happening (S900). When the status change event is not happening (S900: No), the process is directly bought forward to the below-mentioned step of S910.

On the other hand, when the status change event is happening (S900: Yes), status storing data set in the AP 2 or the MFP 4 is updated with data obtained from the sensor or the device driver to show the status of a corresponding one of the AP 2 and the MFP 4 (S905).

Then, it is judged whether a status informing event, which represents that the sensor or the device driver of the AP 2 or the MFP 4 has detected a specific status change to be notified to the PC 3, or that a status stored in the status storing data are in a specific status to be notified to the PC 3, is happening (S910).

When the status informing event is not happening (S910: No), the process directly goes to the below-mentioned step of S920. Meanwhile, when the status informing event is happening (S910: Yes), the protocol portion 64 or 85 is instructed to transmit the status storing data with the status storing data and an IP address of a destination (the PC 3 in this case) of the status storing data being sent to the protocol portion 64 or 85 (S915).

Thereafter, it is judged whether a terminating event, which represents that an instruction for terminating this process issued by a key input from the external has been received, is happening (S920). When the terminating event is not happening (S920: No), the process is brought back to the aforementioned step of S900. Meanwhile, when the terminating event is happening (S920: Yes), the process is terminated.

Figure 15:
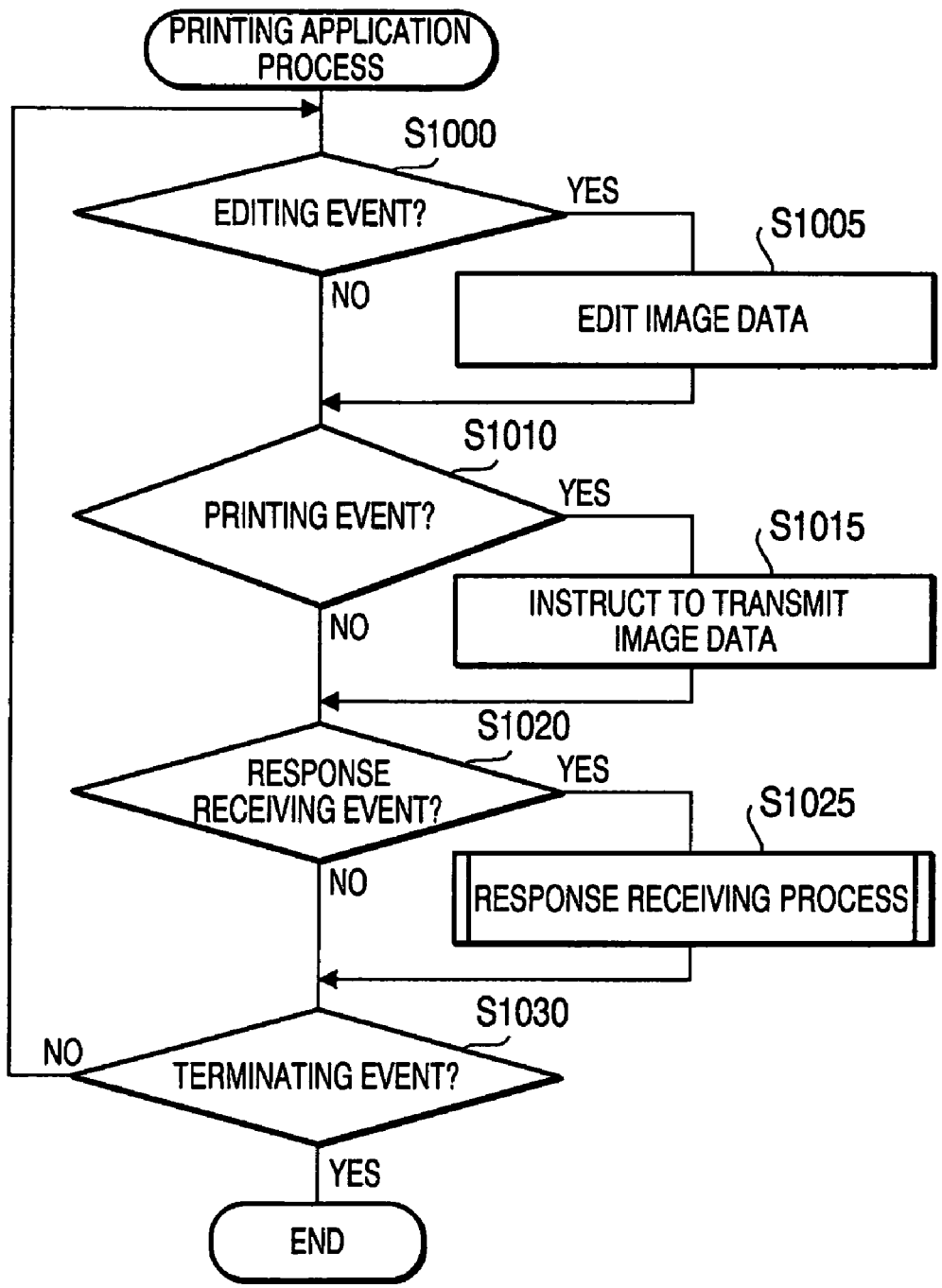
FIG. 15 is a flowchart showing a procedure of a printing application process performed by an LPR application of the PC according to at least one aspect of the invention.

FIG. 15 is a flowchart showing a procedure of a printing application process performed by the LPR application 74 of the PC 3. It is noted that this process is executed in the LPR application 74, triggered by a menu for editing image data being selected by operating the keyboard or the mouse.

As shown in FIG. 15, in this process, first, an editing event, which represents that an input for editing image data has been received from the keyboard or the mouse, is happening (S1000). When the editing event is not happening (S1000: No), the process directly goes to the blow-mentioned step of S1010. Meanwhile, when the editing event is happening (S1000: Yes), the image data are edited in response to an input from the keyboard or the mouse, and thereafter, it is judged whether a printing event, which represents that an input for instructing the MFP 4 to perform a printing operation has been received from the keyboard or the mouse, is happening (S1010).

When the printing event is not happening (S1010: No), the process directly proceed to the below-mentioned step of S1020. Meanwhile, when the printing event is happening (S1010: Yes), the protocol portion is instructed to transmit the image data with the image data and an IP address of a destination of the image data being sent to the protocol portion 75 (S1050).

Then, it is judged whether a response receiving event, which represents that the image data has been received from the protocol portion 75, is happening (S1020). When the response receiving event is not happening (S1020: No), the process is directly brought forward to the below-mentioned step of S1030. Meanwhile, when the response receiving event is happening (S1020: Yes), a response receiving process that was previously set is executed (S1025), and thereafter, it is judged whether a terminating event, which represents that an instruction for terminating the process has been received, is happening (S1030).

When the terminating event is not happening (S1030: No), the process goes back to the aforementioned step of S1000. In the meantime, when the terminating event is happening (S1030: Yes), the process is ended.

Figure 16:
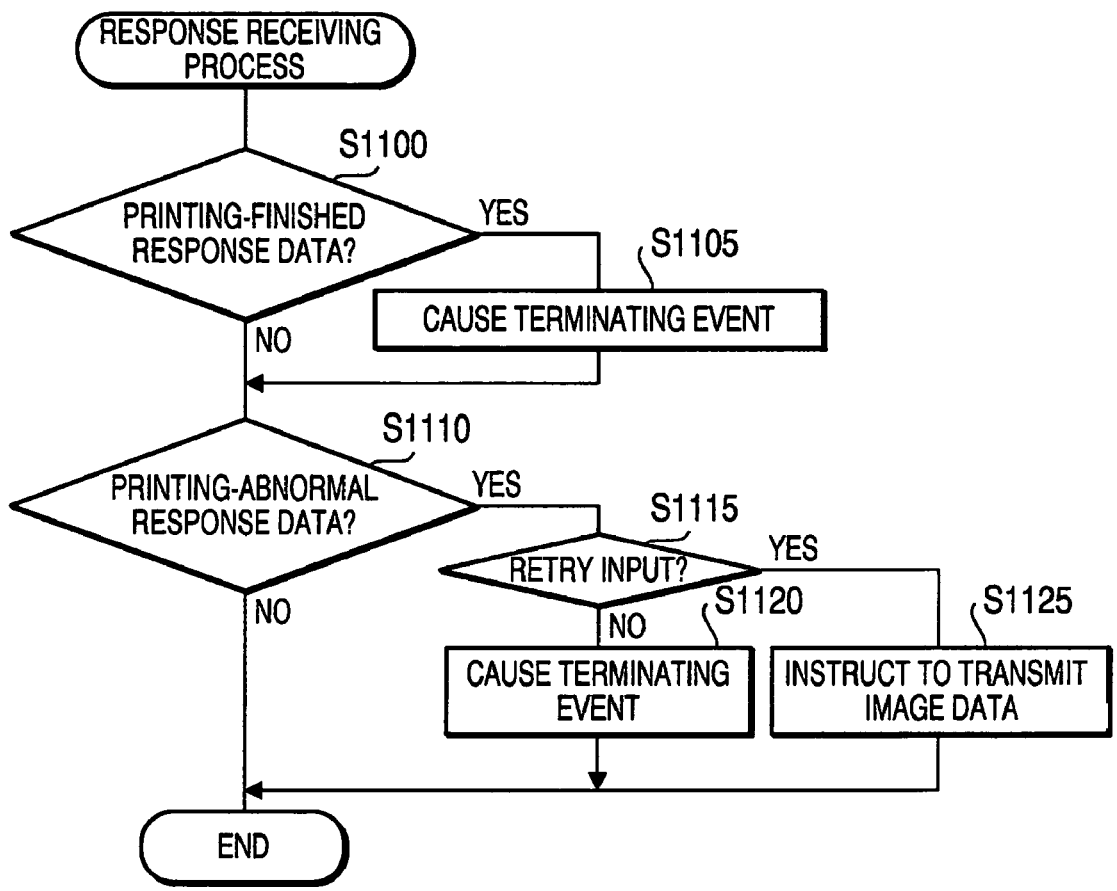
FIG. 16 is a flowchart showing a procedure of a response receiving process according to at least one aspect of the invention.

FIG. 16 is a flowchart showing a procedure of the response receiving process (S1025). As shown in FIG. 16, in this process, first, it is judged whether data received from the protocol portion 75 is printing-finished response data representing that a printing operation is normally finished in the MFP 4 (S1100). When the received data are not the printing-finished response data (S1100: No), the process directly goes to the below-mentioned step of S1110. Meanwhile, when the received data are the printing-finished response data (S1100: Yes), the terminating event is caused (S1105).

Thereafter, it is judged whether the data received from the protocol portion 75 is printing-abnormal response data representing that the printing operation is abnormal in the MFP 4 (S1110). When the received data are not the printing-abnormal response data (S1110: No), the process is immediately terminated.

On the other hand, when the received data are the printing-abnormal response data (S1110: Yes), a dialog for inquiring the user whether to retry transmission of the image data are displayed, and it is judged whether a retry input for re-transmitting the image data from the keyboard or the mouse has been given (S1115). When the retry input has not been given (S1115: No), the terminating event is caused (S1120) to terminate the process.

On the other hand, when the retry input has been given (S1115: Yes), the protocol portion 75 is instructed to transmit the image data in the same process as the step of S1015 in the printing application process, so as to terminate the process.

Figure 17:
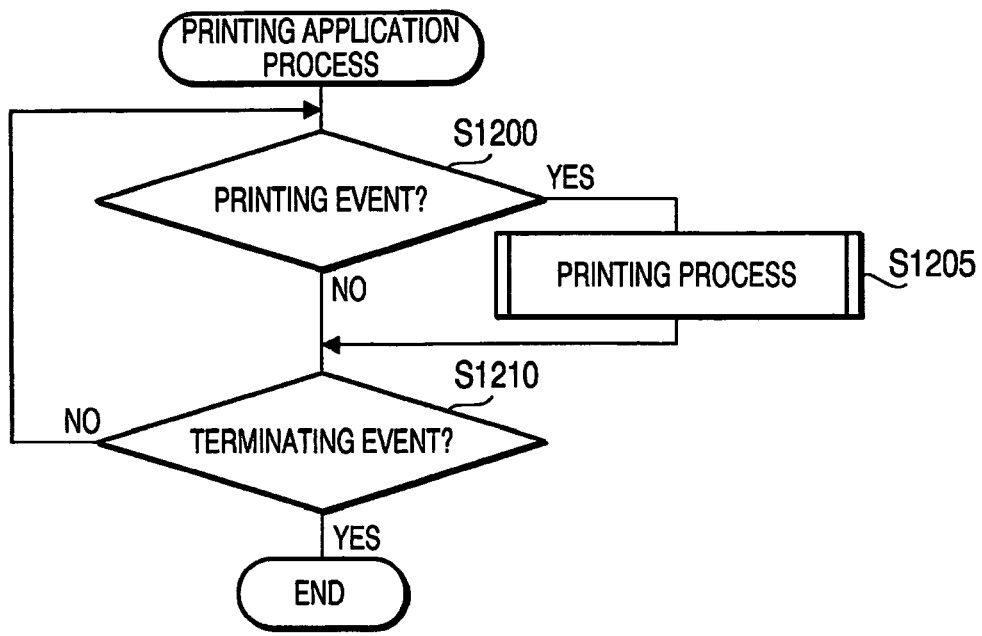
FIG. 17 is a flowchart showing a procedure of a printing application process performed by the LPR application of the MFP according to the present invention.

FIG. 17 is a flowchart showing a procedure of a printing application process performed by the LPR application 84 of the MFP 4. It is noted that this process is executed in the LPR application 84, triggered by a power supply being powered ON in the MFP 4 or the MFP 4 being reset.

As shown in FIG. 17, in this process, first, it is judged whether a printing event, which represents that the image data has been received from the protocol portion 85, is happening (S1200). When the printing event is not happening (S1200: No), the process directly goes to the below-mentioned step of S1210.

In the meantime, when the printing event is happening (S1200: Yes), a printing process that was previously set is executed (S1205), and it is judged whether a terminating event, which represents that an instruction for terminating the process issued by a key input from the external has been received, is happening (S1210).

When the terminating event is not happening (S1210: No), the process is brought back to the aforementioned step of S1200. Meanwhile, when the terminating event is happening (S1210: Yes), the process is terminated.

Figure 18:
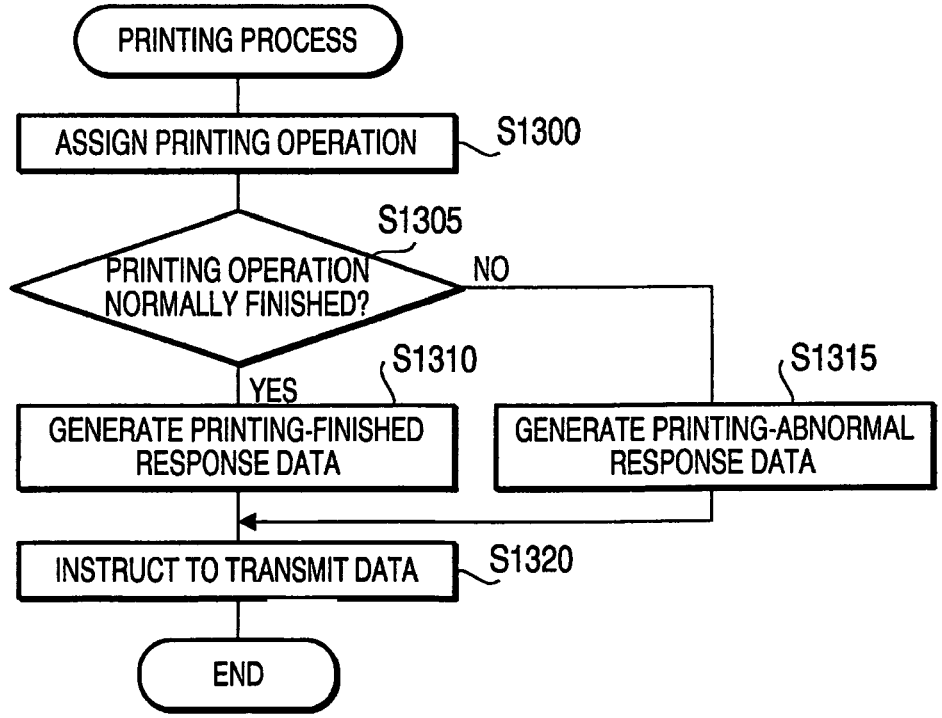
FIG. 18 is a flowchart showing a procedure of a printing process according to at least one aspect of the invention.

FIG. 18 is a flowchart showing a procedure of the printing process (S1205). As shown in FIG. 18, in this process, first, a printing operation is assigned with the image data being sent to the device driver operating the printing portion 45 (S1300), and thereafter, it is judged whether the printing operation is normally finished based upon the data from the sensor or the device driver of the MFP 4 (S1305).

When the printing operation is normally finished (S1305: Yes), the aforementioned printing-finished response data are generated (S1310). Meanwhile, when the printing operation is not normally finished (S1305: No), the aforementioned printing-abnormal response data are generated (S1315).

Then, with an IP address of a destination (the PC 3 in this case) of the data being sent to the protocol portion 85 as well as the generated printing-finished response data or the printing-abnormal response data, the protocol portion 85 is instructed to transmit the data (S1320) to terminate the process.

Figure 19:
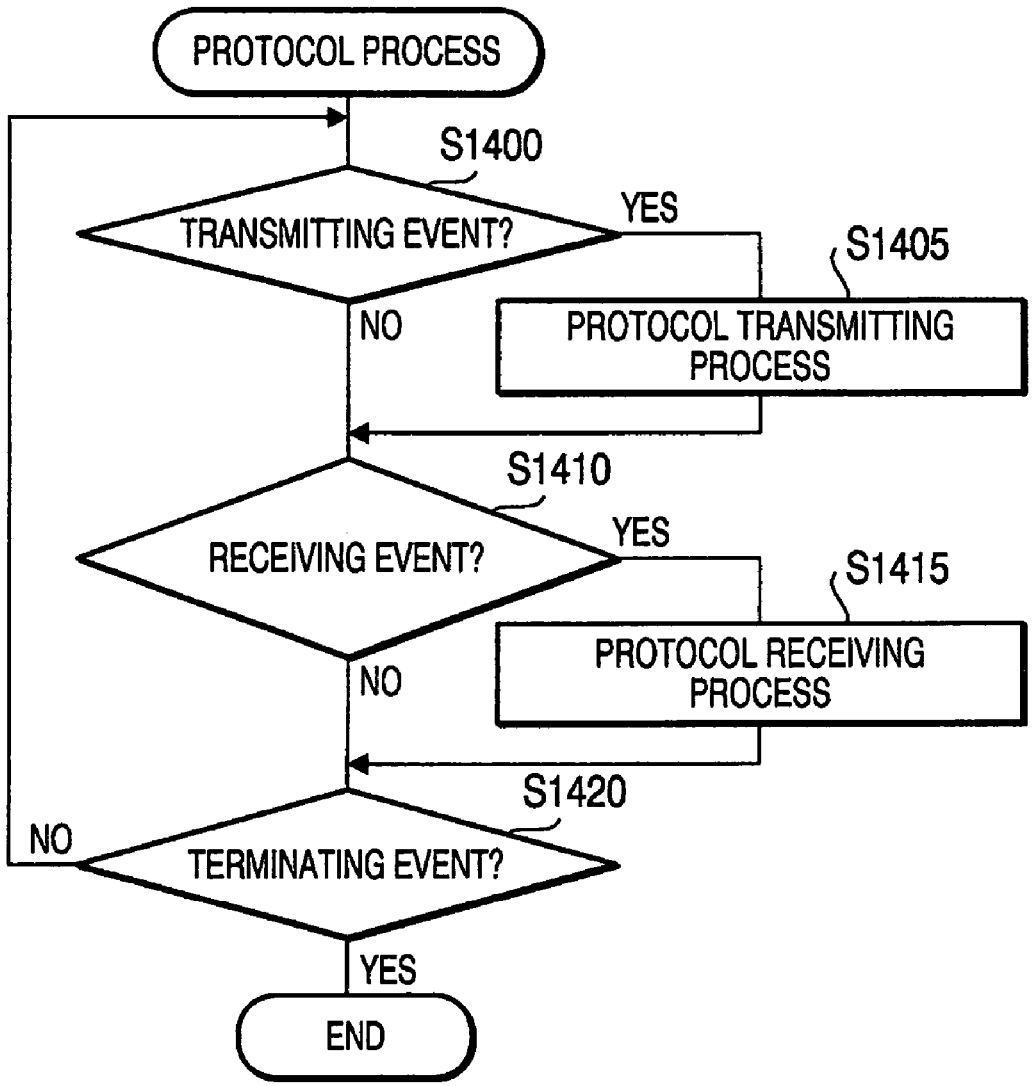
FIG. 19 is a flowchart showing a procedure of a protocol process performed by a protocol portion of each of the AP, PC, and MFP according to at least one aspect of the invention.

FIG. 19 is a flowchart showing a procedure of a protocol process performed by the protocol portion 64, 75, or 85. It is noted that this process is executed in the protocol portion 64, triggered by a power supply being powered ON in the AP 2 or the AP 2 being reset. In addition, this process is executed in the protocol portion 75, triggered by a power supply being powered ON in the PC 3 or the PC 3 being reset. Further, this process is executed in the protocol portion 85, triggered by the power supply being powered ON in the MFP 4 or the MFP 4 being reset.

As shown in FIG. 19, in this process, first, it is judged whether a transmitting event, which represents that data has been received from the SNMP application 63, 73, or 83 or the LPR application 74 or 84, is happening (S1400). When the transmitting event is not happening (S1400: no), the process is directly brought forward to the below-mentioned step of S1410.

In the meantime, when the transmitting event is happening (S1400: Yes), a protocol transmitting process that was previously set is executed (S1405), and thereafter, it is judged whether a receiving event, which represents that a packet has been received from the I/F portion 65, 76, or 86, is happening (S1410). When the receiving event is not happening (S1410: No), the process immediately goes to the below-mentioned step of S1420.

On the other hand, when the receiving event is happening (S1410: Yes), a protocol receiving process that was previously set is executed (S1415), and thereafter, it is judged whether a terminating event, which represents that an instruction for terminating the process issued by a key input from the external has been received, is happening (S1420).

When the terminating event is not happening (S1420: No), the process goes back to the aforementioned step of S1400. Meanwhile, when the terminating event is happening (S1420: Yes), the process is terminated.

Figure 20:
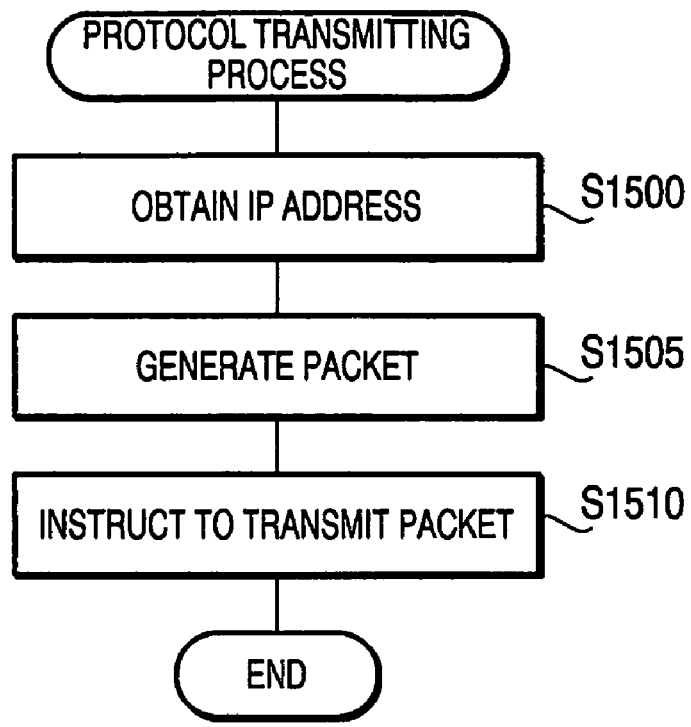
FIG. 20 is a flowchart showing a procedure of a protocol transmitting process according to at least one aspect of the invention.

FIG. 20 is a flowchart showing a procedure of the protocol transmitting process (S1405). As shown in FIG. 20, in this process, first, an IP address of a destination of the data are obtained from the SNMP application 63, 73, or 83 or the LPR application 74 or 84 (S1500), and thereafter, a packet, which includes the data received from the SNMP application 63, 73, or 83 or the LPR application 74 or 84, the IP address of the destination of the data, and an IP address of the sending source device (that is, the AP 2, the PC 3, or the MFP 4), is generated (S1505).

Then, with the generated packet being sent to the I/F portion 65, 76, or 86, the I/F portion 65, 76, or 86 is instructed to transmit the packet (S1510) to terminate the process.

Figure 21:
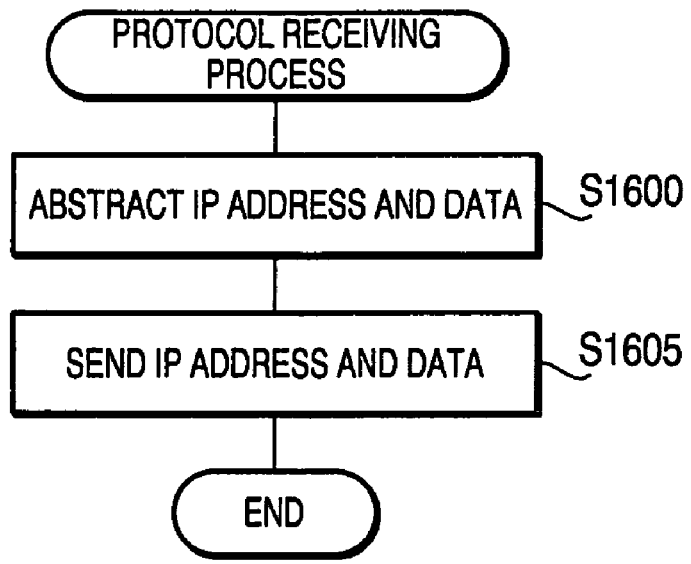
FIG. 21 is a flowchart showing a procedure of a protocol receiving process according to at least one aspect of the invention.

FIG. 21 is a flowchart showing a procedure of the protocol receiving process (S1415). As shown in FIG. 21, in this process, first, the IP address of the sending source device and the data are abstracted from the packet received from the I/F portion 65, 76, or 86 (S1600). Then, when the abstracted data are according to the SNMP protocol, the abstracted data and the IP address of the sending source device are sent to the SNMP application 63, 73, or 83 (S1605) to terminate the process. Meanwhile, when the abstracted data are according to the LPR protocol, the abstracted data and the IP address of the sending source device are sent to the LPR application 74, or 84 (S1605) to terminate the process.

Figure 22:
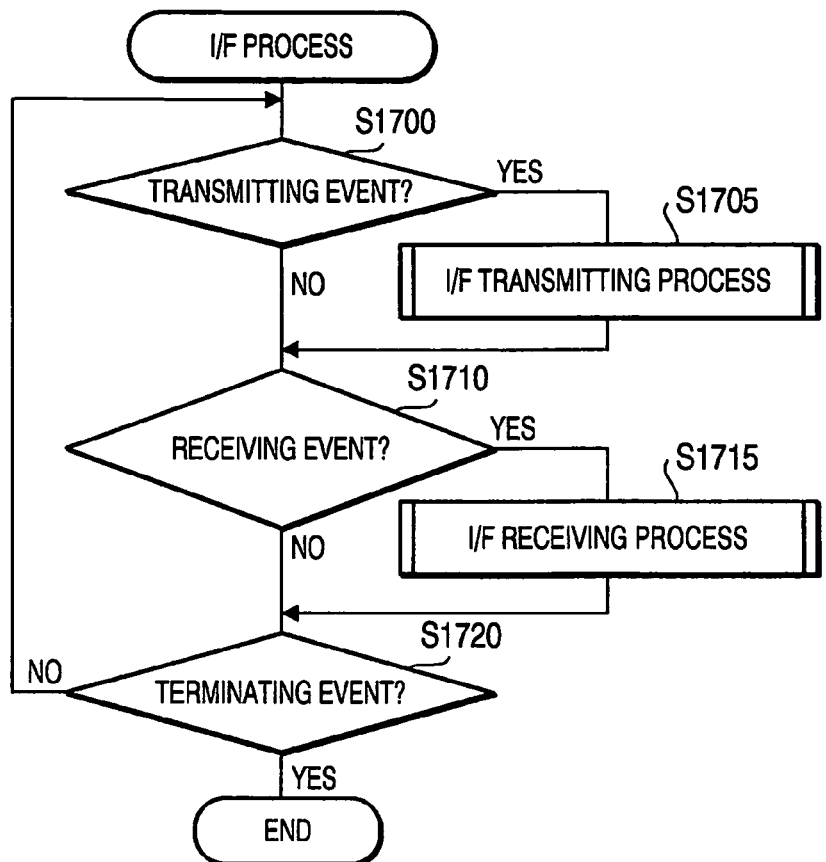
FIG. 22 is a flowchart showing a procedure of an I/F process performed by an I/F portion of each of the AP, PC, and MFP according to at least one aspect of the invention.

FIG. 22 is a flowchart showing a procedure of an I/F process performed by the I/F portion 65, 76, or 86. It is noted that this process is executed in the I/F portion 65, triggered by the power supply being powered ON in the AP 2 or the AP 2 being reset. In addition, the process is executed in the I/F portion 76, triggered by the power supply being powered ON in the PC 3 or the PC 3 being reset. Further, the process is executed in the I/F portion 86, triggered by the power supply being powered ON in the MFP 4 or the MFP 4 being reset.

As shown in FIG. 22, in this process, first, it is judged whether a transmitting event, which represents that the packet is received from the protocol portion 64, 75, or 85, is happening (S1700). When the transmitting event is not happening (S1700: No), the process is directly brought forward to the below-mentioned step of S1710.

On the other hand, when the transmitting event is happening (S1700: Yes), an I/F transmitting process that was previously set is executed (S1705), and thereafter, it is judged whether a receiving event, which represents that the frame is received from the wired I/F portion 67 or the wireless I/F portion 66, 77, or 87, is happening (S1710). When the receiving event is not happening (S1710: No), the process directly goes to the below-mentioned step of S1720.

Meanwhile, the receiving event is happening (S1710: Yes), an I/F receiving process that was previously set is executed (S1715), and thereafter, it is judged whether a terminating event, which represents that an instruction for terminating the process issued by a key input from the external has been received, is happening (S1720).

When the terminating event is not happening (S1720: No), the process goes back to the aforementioned step of S1700. Meanwhile, when the terminating event is happening (S1720: Yes), the process is terminated.

Figure 23:
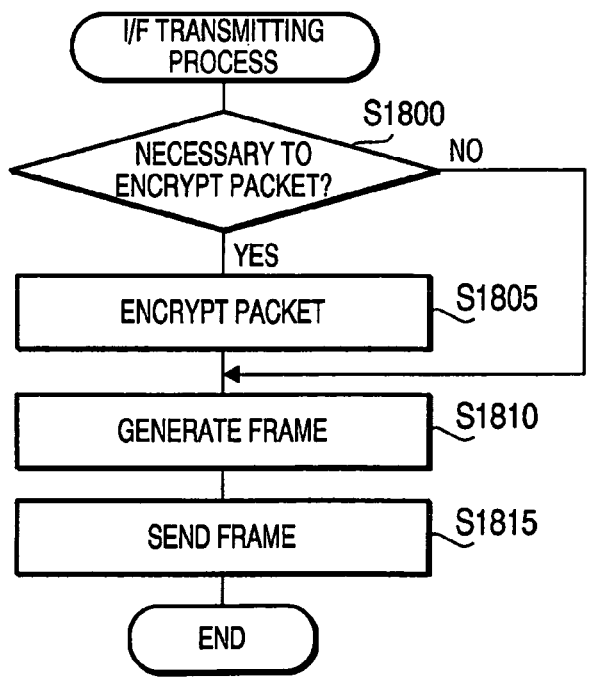
FIG. 23 is a flowchart showing a procedure of an I/F transmitting process according to at least one aspect of the invention.

FIG. 23 is a flowchart showing a procedure of the I/F transmitting process (S1705). As shown in FIG. 23, in this process, first, it is judged whether it is necessary to encrypt the packet, based upon the IP address of the destination of the packet (S1800). Namely, it is judged which the destination of the packet is located on between the wireless transmission channel and the wired transmission channel. When the destination of the packet is located on the wireless transmission channel, it is judged whether it is necessary to encrypt the packet in the case of the relevant device sending and receiving the packet via the wireless transmission channel.

When it is not necessary to encrypt the packet (S1800: No), the process directly proceeds to the below-mentioned step of S1810. Meanwhile, when it is necessary to encrypt the packet (S1800: Yes), the packet is encrypted using an encryption key set by the encryption key setting portion 62, 72, or 82 based upon a common key encryption method that was previously set (WEP (Wired Equivalent Privacy) in the illustrative embodiment) (S1805).

Then, the frame is generated with a MAC address of the destination of the packet being added to the packet (S1810). Thereafter, the generated frame is sent to the wired I/F portion 67 or the wireless I/F portion 66, 77, or 87 depending on the destination thereof (S1815) to be transmitted on the transmission channel, and the process is terminated.

Figure 24:
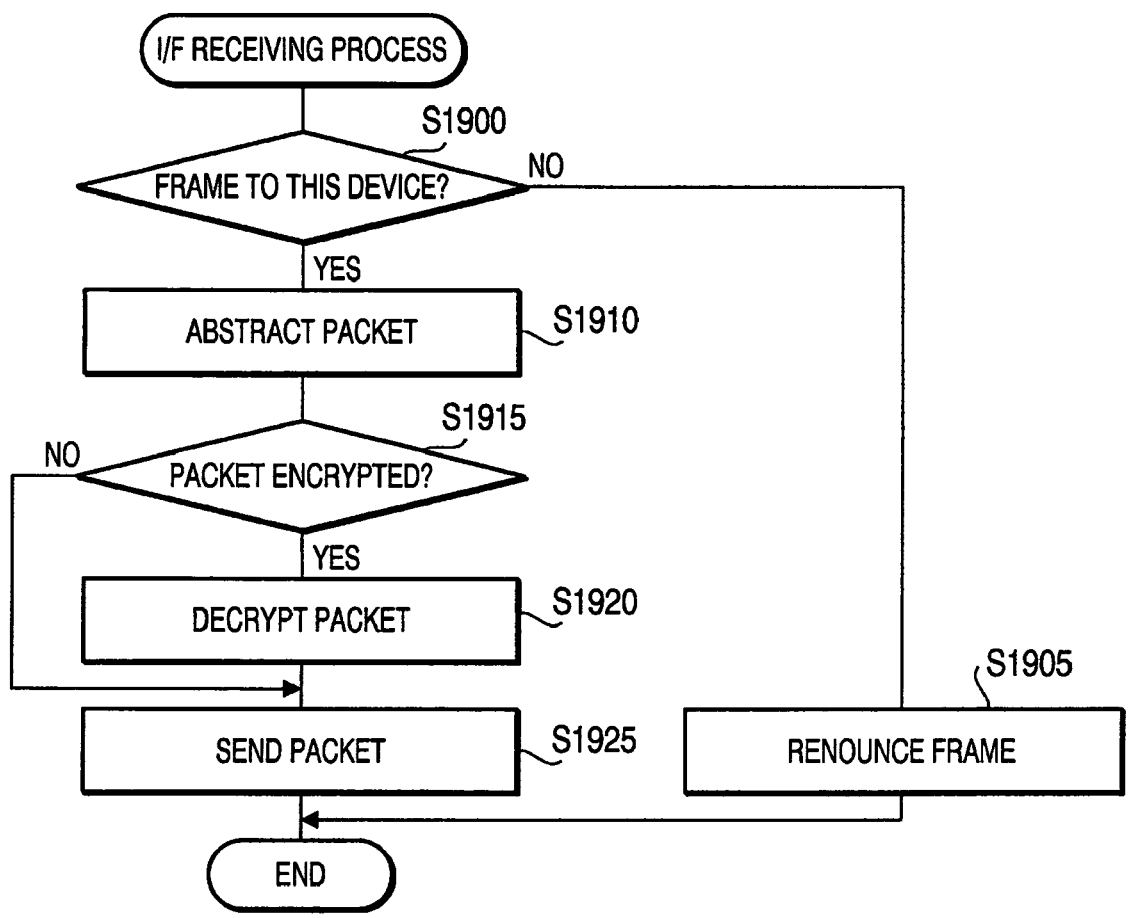
FIG. 24 is a flowchart showing a procedure of an I/F receiving process performed by the I/F portion of each of the PC and MFP according to at least one aspect of the invention.

FIG. 24 is a flowchart showing a procedure of the I/F receiving process (S1715) performed by the I/F portion 76 or 86. As shown in FIG. 24, in this process, first, it is judged whether the destination of the frame is the relevant device by confirming whether the MAC address of the frame received from the wireless I/F 77 or 87 is identical to the MAC address of the relevant device (S1900). When the destination of the frame is not the relevant device (S1900: No), the frame is renounced (S1905), and thereafter, the process is terminated. Of course, if the relevant device is set to receive a multiple addressing frame, the destination of the frame will be judged to be the relevant device in the case where the MAC address of the frame has a value showing that the frame is a multiple addressing frame.

On the other hand, when the destination of the frame is the relevant device (S1900: Yes), the packet is abstracted from the frame (S1910), and then, it is judged whether the abstracted packet is encrypted (S1915).

When the packet is not encrypted (S1915: No), the process directly proceeds to the below-mentioned step of S1925. Meanwhile, when the packet is encrypted (S1915: Yes), the packet is decrypted using the encryption key set by the encryption key setting portion 72 or 82 based upon the common key encryption method that was previously set (the WEP in the illustrative embodiment) (S1920).

Then, the packet is sent to the protocol portion 75 or 85 (S1925) to terminated the process.

Figure 25:
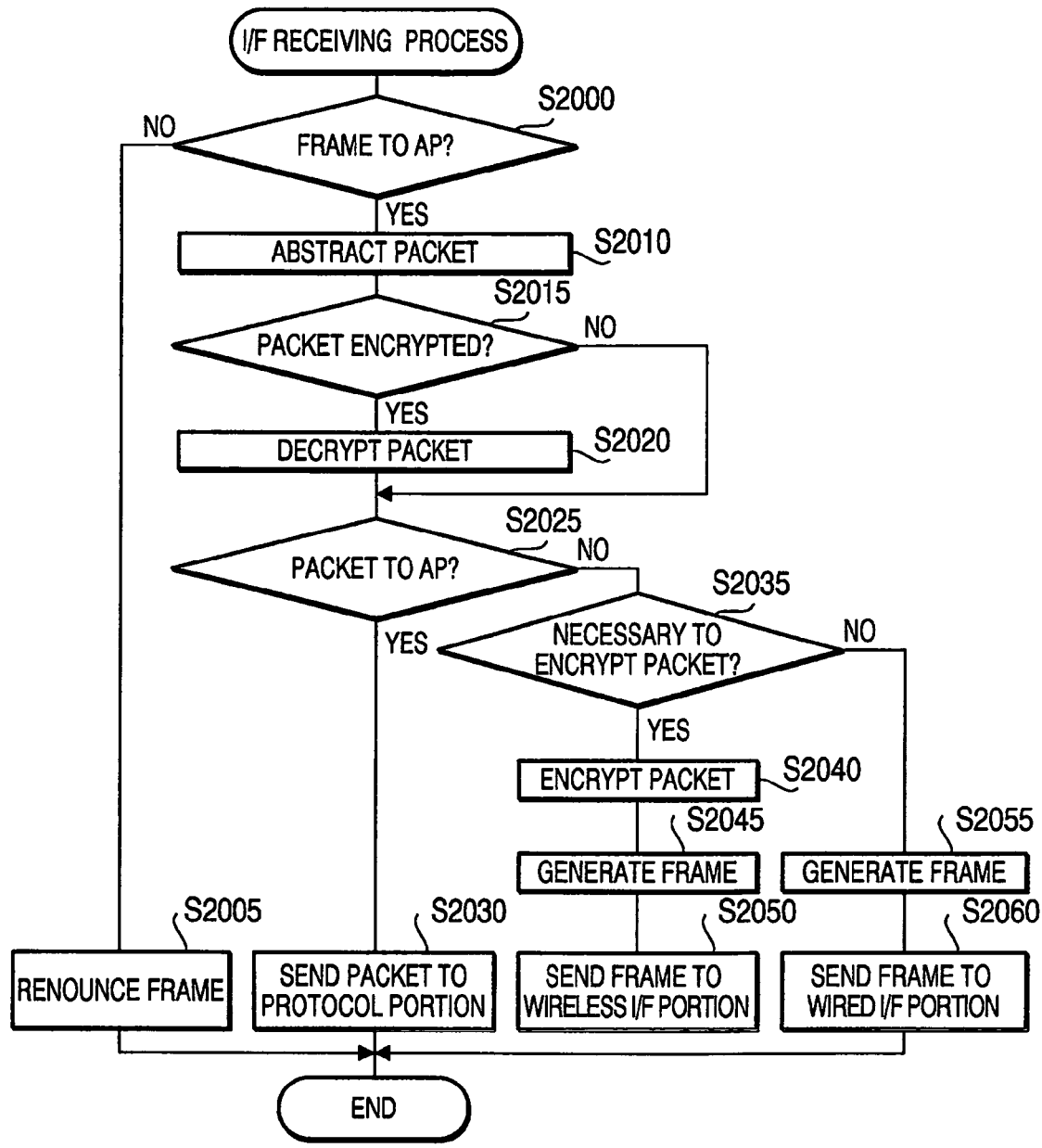
FIG. 25 is a flowchart showing a procedure of an I/F receiving process performed by the I/F portion of the AP according to at least one aspect of the invention.

FIG. 25 is a flowchart showing a procedure of the I/F receiving process (S1715) performed by the I/F portion 65. As shown in FIG. 25, in this process, first, it is judged whether the MAC address of the frame received from the wireless I/F portion 66 or the wired I/F portion 67 is identical to the MAC address of the AP 2 (S2000). When the MAC address of the received frame is not identical to the MAC address of the AP 2 (S2000: No), the frame is renounced (S2005) to terminate the process.

In the meantime, when the MAC address of the received frame is identical to the MAC address of the AP 2 (S2000: Yes), the packet is abstracted from the frame (S2010), and it is judged whether the abstracted packet is encrypted (S2015).

When the abstracted packet is not encrypted (S2015: No), the process directly goes to the below-mentioned step of S2015. Meanwhile, when the abstracted packet is encrypted (S2015: Yes), the packet is decrypted using the encryption key set by the encryption key setting portion 62 based upon the common key encryption method that was previously set (the WEP in the illustrative embodiment) (S2020).

Then, it is judged whether the IP address of the destination included in the packet is identical to the IP address of the AP 2 (S2025). When the IP address of the destination included in the packet is identical to the IP address of the AP 2 (S2025: Yes), the packet is sent to the protocol portion 64 (S2030) to terminate the process.

On the other hand, when the IP address of the destination included in the packet is not identical to the IP address of the AP 2 (S2025: No), it is judged whether it is necessary to encrypt the packet, based upon the IP address of the destination of the packet (S2035). Namely, it is judged which the destination of the packet is located on between the wireless transmission channel and the wired transmission channel. In addition, when the destination of the packet is located on the wireless transmission channel, it is judged whether it is necessary to encrypt the packet in the case where the relevant device sends and receive the packet via the wireless transmission channel.

When it is necessary to encrypt the packet (S2035: Yes), the packet is encrypted using the encryption key set by the encryption key setting portion 62 based upon the common key encryption method that was previously set (the WEP in the illustrative embodiment) (S2040).

Then, the frame is generated with the MAC address of the destination of the packet being added to the packet (S2045) to be sent to the wireless I/F portion 66 (S2050). Thereafter, the frame is transmitted onto the wireless transmission channel to terminate the process.

On the other hand, when it is not necessary to encrypt the packet (that is, when the destination of the packet is located not on the wireless transmission channel, but on the network cable 6) (S2035: No), the frame is generated with the MAC address of the destination of the packet being added to the packet (S2055) to be sent to the wired I/F portion 67 (S2060). Thereafter, the frame is transmitted onto the network cable 6 to terminate the process.

As aforementioned, in the network system 1 of the illustrative embodiment, when the generating menu is selected in the AP 2, the PC 3, or the MFP 4, a corresponding one of the AP 2, PC 3, and MFP 4 generates one code string employing the input code string as an element based upon the selected generating procedure, and sets the generated code string as the encryption key. Therefore, as far as both of the input code string and the generating procedure are not made clear, the set encryption key cannot easily be ascertained. Furthermore, since the code string that has the codes more than the codes included in the input code string is generated, the encryption key, which cannot easily be ascertained because of a lot of codes being included in the generated code string, can be set without much effort.

In addition, in the network system 1 of the illustrative embodiment, the optional code string may be employed as an element depending on the generating procedure. Accordingly, in such a case, since the selected optional code string has to be made clear to ascertain the encryption key, it is more difficult to ascertain the encryption key.

According to the first generating procedure in the various kinds of generating procedures of the illustrative embodiment, the encryption key can be generated only by linking the input code string and optional code string without a complicated procedure being required. In addition, according to the second generating procedure, the encryption key can be generated only by linking the input code string and the first setting code without a complicated procedure being required.

Further, according to the third generating procedure, the encryption key can be generated by performing the exclusive OR operation for the codes included in the input code string and the codes included in the optional code string. Additionally, the encryption key cannot include the input key or the optional key as it is. Hence, the input code string or the optional code string can be prevented from being easily ascertained from the encryption key.

In other words, even though the third party ascertains the encryption key, and tries to generate a similar encryption key using the AP 2, the PC 3, or the MFP 4, it is difficult to ascertain that a similar encryption key can be generated by inputting what kind of input code string, and by selecting which optional code string. Therefore, it is prevented to easily generate a similar encryption key using the AP 2, the PC 3, or the MFP 4.

Furthermore, according to the fourth generating procedure, the encryption key can be generated by performing the exclusive OR operation for the codes included in the input code string and the second setting code and thereafter linking the code string obtained by the exclusive OR operation and the optional code string.

Moreover, according to the network system 1 in the illustrative embodiment, the optional code string includes the codes that are set non-enterable in the ASCII codes. Accordingly, even though the input code string, the generating procedure, and/or the optional code string are made clear by the third party, since it is impossible to input the codes that are set non-enterable, it is difficult for the third party to generate the encryption key.

Further, according to the network system 1 in the illustrative embodiment, when the input menu is selected in the AP 2, the PC 3, or the MFP 4, the input code string is set as the encryption key as it is. Hence, when the user wants to set the input code string as the encryption key, the input code string inputted can be set as the encryption key as it is by selecting the input menu.

In addition, according to the network system 1 in the illustrative embodiment, even when the generating menu is selected in the AP 2, the PC 3, or the MFP 4, if the number of the codes included in the input code string is equal to or more than the specified number, the input code string will be set as the encryption key. Therefore, the user, who does not mind inputting a lot of codes to set the encryption key that cannot easily be ascertained by the third party, can set the encryption key. Additionally, the network system 1 can communicate not only with the devices to which the present invention is applied, but also with conventional devices for which the input code string can merely be set as the encryption key.

Further, according to the network system 1 in the illustrative embodiment, using the encryption key set as aforementioned, data to be transmitted can be encrypted, and data, which is encrypted by an encryption key set based upon the same procedure, can be decrypted.

Further, according to the network system 1 in the illustrative embodiment, the AP 2 decrypts the received packet once, and thereafter, when the destination of the packet is the network cable 6, the packet is sent onto the network cable 6 without encrypting the packet. Therefore, when the packet is relayed via the network cable 6 through which the data transmitted cannot easily be intercepted by the third party compared with the wireless transmission channel, since the packet to be relayed is decrypted, effort for decrypting the packet at a next transmission site can be saved. Thereby, the network system 1 can preferably employed at a transmission site that does not have a means to decrypt the packet.

Hereinabove, the illustrative embodiment according to the present invention has been explained. However, the present invention is not limited to the aforementioned aspects of the illustrative embodiment. It is needless to say that various modifications may be possible within such a scope as not to extend beyond the essential teachings of the present invention.

For example, in the aforementioned illustrative embodiment, there is described the setting of the encryption key that may be used by the relevant device for sending and receiving the packet via the wireless transmission channel. The present invention may be applied to the setting of the encryption key that may be used by the relevant device for sending and receiving the packet via the wired transmission channel.

In addition, according to the aforementioned illustrative embodiment, in the first generating process, the optional code string is linked at the rear end of the input code string, yet it may be linked at the head of the input code string. Further, the optional code string may be linked to the input code string, inserted into a previously specified place in the input code string. Further, the optional code string may be linked to the input code string such that each of the codes included in the optional code string is inserted between each couple of adjacent codes of the input code string in order.

Further, according to the aforementioned illustrative embodiment, in the second generating process, the first setting code is linked to the rear end of the input code string, yet it may be linked at the head of the input code string. Also, the first setting code may be linked to the input code string, inserted into a previously specified place in the input code string.

Further, according to the aforementioned illustrative embodiment, in the third generating process, the logic operation is intended only for a part of the codes included in the optional code string. However, the logic operation may be intended for all of the codes included in the optional code string. Further, according to the aforementioned illustrative embodiment, in the fourth generating process, the logic operation is intended for all of the codes included in the input code string, yet it may be intended for a part of the codes included in the input code string.

Further, according to the aforementioned illustrative embodiment, in the fourth generating procedure, the optional code string is linked at the rear end of the code string obtained as the result of the logic operation. However, the optional code string may be linked at the head of the code string obtained as the result of the logic operation, and may be linked to the code string obtained by the logic operation, inserted into a previously specified place in the code string obtained by the logic operation. Further, the optional code string may be linked to the code string such that each of the codes included in the optional code string is inserted between each couple of adjacent codes of the code string obtained by the logic operation in order.

Further, according to the aforementioned illustrative embodiment, in each of the third and fourth generating processes, the exclusive OR operation is performed. However, alternatively, an exclusive negative OR operation may be performed. Further, according to the aforementioned illustrative embodiment, the first to the fourth generating processes are set. However, any one, two, or three may be set among them.

Further, according to the aforementioned illustrative embodiment, the encryption and decryption are performed based upon the WEP. However, the encryption and decryption may be performed based upon one of the other common key encryption methods. Further, according to the aforementioned illustrative embodiment, the present invention is applied to the common key encryption method. However, the application of the present invention is not limited to the common key encryption method. The present invention may be applied to any encryption method, such as a public key encryption method, for performing encrypting and decrypting data by setting an encryption key.

Further, according to the aforementioned illustrative embodiment, the ASCII codes are set as a character code standard for each of the AP 2, PC 3, and MFP 4. However, another character code standard such as JIS (Japan Industrial Standard) codes or shift JIS codes may be set.

Further, according to the aforementioned illustrative embodiment, the MFP is one of the devices to which the present invention is to be applied. However, another device such as a scanner and printer may be a device to which the present invention is to be applied.

What is claimed is:

1. An encryption key setting device configured to set an encryption key, comprising:
   a code string inputting system configured to receive an external input of a code string;
   a code number determination system configured to determine whether the inputted code string includes a total number of codes less than a specified number or includes a total number of codes equal to or greater than the specified number;
   a generating procedure selecting system configured to receive an external input for selecting any one from a plurality of generating procedures that were previously set responsive to the code number determination system determining that the inputted code string includes a total number of codes less than the specified number;
   a code string generating system configured to generate a code string using the code string inputted through the code string inputting system based upon the generating procedure selected through the generating procedure selecting system;
   a first encryption key setting system configured to set the code string generated through the code string generating system as the encryption key;
   a specified input receiving system configured to receive an external specified input that was previously set; and
   a second encryption key setting system configured to forbid an operation of the first encryption key setting system when the number of codes included in the code string inputted through the code string inputting system is equal to or more than a specified number that was previously set, and set the inputted code string as the encryption key.

2. The encryption key setting device according to claim 1, further comprising a code string selecting system configured to receive an external input for selecting any one from a plurality of optional code strings that were previously set,
wherein the plurality of generating procedures includes at least one generating procedure in which the code string to be set as the encryption key by the first encryption key setting system is generated using the optional code string selected through the code string selecting system as well as the code string inputted through the code string inputting system.

3. The encryption key setting device according to claim 2, wherein the plurality of generating procedures includes at least one generating procedure in which the code string to be set as the encryption key by the first encryption key setting system is generated by linking the inputted code string and the selected optional code string.

4. The encryption key setting device according to claim 2, wherein the plurality of generating procedures includes at least one generating procedure in which the code string to be set as the encryption key by the first encryption key setting system is generated by performing one logic operation of an exclusive OR operation and an exclusive negative OR operation for codes included in the inputted code string and codes included in the selected optional code string.

5. The encryption key setting device according to claim 2, wherein the plurality of generating procedures includes at least one generating procedure in which the code string to be set as the encryption key by the first encryption key setting system is generated by performing one logic operation of an exclusive OR operation and an exclusive negative OR operation for codes included in the inputted code string and a setting code that was previously set, and linking the code string generated by the logic operation and the selected optional code string.

6. The encryption key setting device according to claim 2, wherein each of the plurality of optional code strings includes at least one code that is set non-enterable in a character code standard that was previously set.

7. The encryption key setting device according to claim 1, wherein the plurality of generating procedures includes at least one generating procedure in which the code string to be set as the encryption key by the first encryption key setting system is generated by linking the inputted code string and a setting code that was previously set.

8. The encryption key setting device according to claim 1, further comprising:
a specified input receiving system configured to receive an external specified input that was previously set,
wherein the second encryption key setting system is configured to forbid an operation of the first encryption key setting system when the specified input receiving system receives the external specified input, and set the code string inputted through the code string inputting system as the encryption key.

9. The encryption key setting device according to claim 1, wherein the second encryption key setting system is further configured to set the inputted code string as an encryption key when the inputted code string includes a total number of codes equal to or greater than the specified number without using the code string generation system.

10. A data transmitting device, comprising:
an encryption key setting device configured to set an encryption key, the encryption key setting device comprising:
a code string inputting system configured to receive an external input of a code string;
a code number determination system configured to determine whether the inputted code string includes a total number of codes less than a specified number or includes a total number of codes equal to or greater than the specified number;
a generating procedure selecting system configured to receive an external input for selecting any one from a plurality of generating procedures that were previously set responsive to the code number determination system determining that the inputted code string includes a total number of codes less than the specified number;
a code string generating system configured to generate a code string using the code string inputted through the code string inputting system based upon the generating procedure selected through the generating procedure selecting system;
a first encryption key setting system configured to set the code string generated through the code string generating system as the encryption key;
a specified input receiving system configured to receive an external specified input that was previously set; and
a second encryption key setting system configured to forbid an operation of the first encryption key setting system when the number of codes included in the code string inputted through the code string inputting system is equal to or more than a specified number that was previously set, and set the inputted code string as the encryption key;
a data transmitting system configured to transmit data to an external device; and
an encrypting system configured to encrypt the data to be transmitted by the data transmitting system based upon the encryption key set by the encryption key setting device.

11. The data transmitting device according to claim 10, wherein the second encryption key setting system is further configured to set the inputted code string as an encryption key when the inputted code string includes a total number of codes equal to or greater than the specified number without using the code string generation system.

12. A data receiving device, comprising:
an encryption key setting device configured to set an encryption key, the encryption key setting device comprising:
a code string inputting system configured to receive an external input of a code string;
a code number determination system configured to determine whether the inputted code string includes a total number of codes less than a specified number or includes a total number of codes equal to or greater than the specified number;
a generating procedure selecting system configured to receive an external input for selecting any one from a plurality of generating procedures that were previously set responsive to the code number determination system determining that the inputted code string includes a total number of codes less than the specified number;

a code string generating system configured to generate a code string using the code string inputted through the code string inputting system based upon the generating procedure selected through the generating procedure selecting system;

a first encryption key setting system configured to set the code string generated through the code string generating system as the encryption key;

a specified input receiving system configured to receive an external specified input that was previously set; and a second encryption key setting system configured to forbid an operation of the first encryption key setting system when the number of codes included in the code string inputted through the code string inputting system is equal to or more than a specified number that was previously set, and set the inputted code string as the encryption key;

a data receiving system configured to receive data from an external device; and a decrypting system configured to decrypt the data to be received by the data receiving system based upon the encryption key set by the encryption key setting device.

13. The data receiving device according to claim 12, wherein the second encryption key setting system is further configured to set the inputted code string as an encryption key when the inputted code string includes a total number of codes equal to or greater than the specified number without using the code string generation system.

14. An access point, comprising:

an encryption key setting device configured to set an encryption key, the encryption key setting device comprising:

a code string inputting system configured to receive an external input of a code string;

a code number determination system configured to determine whether the inputted code string includes a total number of codes less than a specified number or includes a total number of codes equal to or greater than the specified number;

a generating procedure selecting system configured to receive an external input for selecting any one from a plurality of generating procedures that were previously set responsive to the code number determination system determining that the inputted code string includes a total number of codes less than the specified number;

a code string generating system configured to generate a code string using the code string inputted through the code string inputting system based upon the generating procedure selected through the generating procedure selecting system;

a first encryption key setting system configured to set the code string generated through the code string generating system as the encryption key;

a specified input receiving system configured to receive an external specified input that was previously set; and a second encryption key setting system configured to forbid an operation of the first encryption key setting system when the number of codes included in the code string inputted through the code string inputting system is equal to or more than a specified number that was previously set, and set the inputted code string as the encryption key;

a data relaying system configured to receive data from an external device and send the data to a destination thereof; and a decrypting system configured to decrypt the data to be received and sent by the data relaying system based upon the encryption key set by the encryption key setting device.

15. The access point according to claim 14, wherein the second encryption key setting system is further configured to set the inputted code string as an encryption key when the inputted code string includes a total number of codes equal to or greater than the specified number without using the code string generation system.

16. A network system, comprising:

a data transmitting device with a first encryption key setting device;

a data receiving device with a second encryption key setting device; and an access point with a third encryption key setting device wherein each of the first second and third encryption on key setting devices includes:

a code string inputting system configured to receive an external input of a code string;

a code number determination system configured to determine whether the inputted code string includes a total number of codes less than a specified number or includes a total number of codes equal to or greater than the specified number;

a generating procedure selecting system configured to receive an external input for selecting any one from a plurality of generating procedures that were previously set responsive to the code number determination system determining that the inputted code string includes a total number of codes less than the specified number;

a code string generating system configured to generate a code string using the code string inputted through the code string inputting system based upon the generating procedure selected through procedure selecting system; and a first encryption key setting system configured to set the code string generated through the code string generating system as the encryption key;

a specified input receiving system configured to receive an external specified input that was previously set; and a second encryption key setting system configured to forbid an operation of the first encryption key setting system when the number of codes included in the code string inputted through the code string inputting system is equal to or more than a specified number that was previously set, and set the inputted code string as the encryption key, wherein the data transmitting device further comprises:

a data transmitting system configured to transmit data to the access point; and an encrypting system configured to encrypt the data to be transmitted by the data transmitting system based upon the encryption key set by the first encryption key setting device, wherein the data receiving device further comprises:

a data receiving system configured to receive data from the access point; and a first decrypting system configured to decrypt the data to be received by the data receiving system based upon the encryption key set by the first encryption key setting device, and wherein the access point further comprises:
- a data relaying system configured to receive data from the data transmitting device and send the data to the data receiving device; and
- a second decrypting system configured to decrypt the data to be received and sent by the data relaying system based upon the encryption key set by the first encryption key setting device.

17. The network system according to claim 16,
wherein the second encryption key setting system is further configured to set the inputted code string as an encryption key when the inputted code string includes a total number of codes equal to or greater than the specified number without using the code string generation system.

* * * * *